US008760409B2

(12) United States Patent
Kinoshita et al.

(10) Patent No.: US 8,760,409 B2
(45) Date of Patent: Jun. 24, 2014

(54) IMAGE DISPLAY UNIT WITH SCREEN INPUT FUNCTION

(75) Inventors: Masayoshi Kinoshita, Hachioji (JP); Hiroshi Kageyama, Hachioji (JP)

(73) Assignees: Hitachi Displays Co., Ltd., Mobara-Shi, Chiba-Ken (JP); Panasonic Liquid Crystal Display Co., Ltd., Himeji-Shi, Hyogo-Ken (JP)

( * ) Notice: Subject to any disclaimer, the term of this patent is extended or adjusted under 35 U.S.C. 154(b) by 1601 days.

(21) Appl. No.: 11/934,766

(22) Filed: Nov. 3, 2007

(65) Prior Publication Data
US 2008/0122804 A1    May 29, 2008

(30) Foreign Application Priority Data

Nov. 27, 2006    (JP) .................................. 2006-318356

(51) Int. Cl.
*G09G 5/00*    (2006.01)
(52) U.S. Cl.
USPC ............................. 345/173; 345/204; 345/82
(58) Field of Classification Search
USPC ......................................... 345/173, 204, 82
See application file for complete search history.

(56) References Cited

U.S. PATENT DOCUMENTS

| 2001/0000676 | A1* | 5/2001 | Zhang et al. ..................... 349/12 |
| 2005/0007353 | A1* | 1/2005 | Smith et al. ................... 345/204 |
| 2008/0068311 | A1* | 3/2008 | Rast ................................ 345/82 |

FOREIGN PATENT DOCUMENTS

JP    2005-129948 A    5/2005

* cited by examiner

*Primary Examiner* — William Boddie
*Assistant Examiner* — Leonid Shapiro
(74) *Attorney, Agent, or Firm* — Miles & Stockbridge P.C.

(57) ABSTRACT

An image display unit with screen input function is provided, by which it is possible to input image data directly to a screen without decreasing numerical aperture of pixel. The image display unit comprises a light detecting TFT 61 receiving a light entering from a screen of a liquid crystal display panel, said light detecting TFT 61 is connected in series to a switching TFT 60, which does not receive a light entering from the screen of the liquid crystal display panel. To a source electrode of the light detecting TFT 61, a storage capacitor Cst and a pixel electrode of a liquid crystal element are connected. The liquid crystal element is represented by a capacitor $C_{LC}$. A sensor control line 140 is connected to the gate electrode of the light detecting TFT 61, and a gate line 120 is connected to the gate electrode of the switching TFT 60. A data line 110 is connected to the drain electrode of the switching TFT 60, and a storage line 150 is connected to one end of a storage capacitor Cst. An image signal is sent to a pixel electrode (ITO) of the liquid crystal element ($C_{LC}$). The light detecting TFT 61 transmits photoelectric current $I_{sig}$ generated by sensing the light to a sensor signal processing circuit (see FIG. 1) via the data line 110.

13 Claims, 21 Drawing Sheets

IMAGE DISPLAY UNIT WITH SCREEN INPUT FUNCTION

BACKGROUND OF THE INVENTION

1. Field of the Invention

The present invention relates to an image display unit with an optical sensor incorporated in a display panel. In particular, the invention relates to an image display unit with screen input function, by which image data can be directly inputted to screen without decreasing numerical aperture of pixel.

2. Description of the Prior Art

An image display unit with screen input function is known, which inputs information by touching operation (hereinafter may be referred simply as "touch") by touching the screen with a finger of a user. This type of image display unit is used in a portable terminal with a touching sensor such as PDA or in a stationary type client guiding terminal. As the image display unit screen input function, there are several types: a type to detect the change of resistance in the portion pressed by touching, a type to detect the change of capacity, or a type to detect the change of light amount in the portion shielded by touching.

In particular, efforts have been made in recent years, to develop a type of image display unit to detect coordinates of the touching portion by finding the changes of the light amount of the external light in the pixel structure on the screen. For instance, the Patent Document 1 discloses a light sensing element (optical sensor) by a thin-film transistor (TFT) for each pixel on a liquid crystal display panel, which makes up a liquid crystal display unit.

FIG. 20 shows an equivalent circuit diagram to explain pixel arrangement in a conventional example of a general type liquid crystal display panel with optical sensor for each pixel unit as disclosed in the Patent Document 1. This liquid crystal display panel comprises a plurality of gate lines (GLs), a plurality of data lines (DLs), a first switching element (Q1) electrically connected to each of the gate lines (GLs) and the data lines (DLs), and a liquid crystal capacitor ($C_{LC}$) and a first storage capacitor (CST1) each connected to the first switching element (Q1), Further, it comprises a first voltage line (VL1), a second voltage line (VL2), a second switching element (TS1) to detect the intensity of external light and to convert it to electric current, a second storage capacitor (CST2) for preserving electric charge generated by electric current provided from the second switching element (TS1), a third switching element (TS2) to output the electric charge maintained at the second storage capacitor (CST2), and a reading line (ROL). The second switching element (TS1), the second storage capacitor (CST2), and the third switching element (TS2) make up together a type of optical sensor.

[Patent Document 1] JP-A-2005-129948.

SUMMARY OF THE INVENTION

The optical sensor structure as disclosed in the Patent Document 1 requires the number of elements including many thin-film transistors for each pixel. This means that numerical aperture of pixel for the display is decreased. Also, the increase of the elements means the increase of power consumption. The brightness of the screen is deteriorated by the decrease in the numerical aperture, and the increase of power consumption results in the reduction of operating time at a portable type terminal.

It is an object of the present invention to provide an image display unit with screen input function, by which it is possible to directly input the image data to the screen without decreasing the numerical aperture of pixel.

To attain the above object, representative arrangement and operation of the present invention are disclosed in an example of liquid crystal display unit as follows: In the image display unit with screen input function according to the present invention, it is so designed that an optical sensor comprising a thin-film transistor is provided in a pixel area on an insulating substrate such as a glass substrate to have the structure and the operation as given below.

(1) To a drain electrode or a source electrode (a drain electrode in this case) of a thin-film transistor for switching (switching TFT), for which the light entering from the direction of display surface of the screen is shielded, a source electrode or a drain electrode (a source electrode in this case) of a thin-film transistor for light sensing (a light detecting TFT) to receive the light from the direction of display surface of the screen is connected, and these two TFTs are connected with each other in series.

(2) An auxiliary capacitor and a pixel electrode are connected to the source electrode or the drain electrode of the light detecting TFT.

(3) A sensor control line is connected to a gate electrode of the light detecting TFT, and a gate line for pixel selection is connected to the switching TFT.

(4) A data line is connected to a drain electrode or a source electrode (a source electrode in this case) of the switching TFT.

(5) One of the electrodes of the storage capacitor and the pixel electrode are connected in parallel to a drain electrode or a source electrode (a drain electrode in this case) of the light detecting TFT.

(6) The other of the electrodes of the storage capacitor is connected to a storage line.

(7) In a touching period (a sensing period), the light detecting TFT is turned on by a sensing period selecting signal applied from a sensing control line, and photoelectric current sensed by the light detecting TFT is accumulated in the storage capacitor as electric charge.

(8) This accumulated electric charge is read on the data line as photoelectric current via the switching TFT, and a signal obtained by voltage conversion is transmitted to a sensor signal processing circuit disposed outside of the pixel area.

(9) The sensor signal processing circuit generates a judging signal such as a bivalent signal to judge whether there has been touching or not according to the transmitted voltage signal.

(10) The judging signal to indicate whether there has been touching or not is transmitted to an upper control circuit of the image display unit, and an instruction is given as set up on coordinates (such as position of touch button) on the touched pixel area.

The source electrode and the drain electrode of the thin-film transistor TFT is changed over during the operation of the display panel. To facilitate the explanation, description will be given by assuming that the source electrode and the drain electrode are fixed as described above.

The present invention is suitable and preferred for an active driving type liquid crystal display unit, while the invention can also be applied to an organic EL display unit of active driving type or other image display unit of similar type, and to an optical sensor application devices. The characteristics of the image display unit of the present invention are as follows:

The present invention provides an image display unit with screen input function for inputting information by touching operation to pixel area of an insulating substrate, said image display unit comprises:

a first thin-film transistor shielded from projection of external light, and a second thin-film transistor connected in series to the first thin-film transistor and receiving projection of said light, said first and said second thin-film transistors disposed for each pixel in an pixel area comprising a plurality of pixels to constitute said screen on main surface of said insulating substrate, said image display unit further comprises:

gate lines connected to gate electrodes of said first thin-film transistor;

sensor control lines connected to gate electrodes of said second thin-film transistor;

data lines connected to a drain electrode or a source electrode of said first thin-film transistor; and an auxiliary capacitor where one of the electrodes is connected to a source electrode or a drain electrode of said second thin-film transistor and a pixel electrode where one of the electrodes of the pixel is connected in parallel to said auxiliary capacitor;

said second thin-film transistor is turned on by a sensing time selecting signal applied from said sensor control line during a period different from the image display period by said pixel, and photoelectric current generated by the sensing of said second thin-film transistor is accumulated as electric charge in said storage capacitor; and said accumulated electric charge is read out on said data line as photoelectric current via said first thin-film transistor, and said electric charge is turned to a touching signal after voltage conversion.

The present invention provides the image display unit as described above, wherein there is provided a storage line where the other of the electrodes of said storage capacitor is connected, a sensor signal processing circuit is disposed for generating a judging signal to judge whether there has been touching operation or not according to a detection signal of said touching operation on outer side of said pixel area, and said judging signal is a bivalent signal, said judging signal is sent to an upper control circuit of said image display unit and carries out an instruction as set up on coordinates of a touched site on the touch pixel area.

Further, the present invention provides the image display unit as described above, wherein, there is provided on the data line a changeover switch to change over between a display signal and a detection signal of the touching operation, said sensor control line is commonly used by two pixels adjacent to each other in a direction of alignment of said gate line, said sensor control line is substituted by said storage line, and a period different from said image display period is a blanking period within one frame period.

Also, the present invention provides the image display unit as described above, wherein an image display unit with screen input function for inputting information by touching operation to a pixel area of an insulating substrate, said image display unit comprises:

a pixel area including a plurality of pixel groups formed on main surface of said insulating substrate with a group of red pixel, green pixel, blue pixel and white pixel on said screen as one group;

except one pixel out of the red pixel, the green pixel, the blue pixel and the white pixel to make up each group, the other three pixels are provided by a first thin-film transistor shielded from projection of the external light;

said one pixel among said each group is provided by a first thin-film transistor shielded from projection of light coming from the direction of said pixel area surface and a second thin-film transistor connected in series to said first thin-film transistor and receiving projection of said external light; said image display unit further comprises:

gate lines connected to gate electrodes of said first thin-film transistor;

sensor control lines connected to gate electrodes of said second thin-film transistor;

data lines connected to a drain electrode or a source electrode of said first thin-film transistor; and there are further provided a storage capacitor where one of the electrodes is connected to a source electrode or a drain electrode of said first thin-film transistor, and a pixel electrode where one of the electrodes of the pixel is connected in parallel to said storage capacitor;

there are provided an auxiliary capacitor with one of the electrodes connected to a source electrode or a drain electrode of said second thin-film transistor to make up said one pixel, and a pixel electrode with one of the electrodes of the pixel connected in parallel to the auxiliary capacitor is connected; and said second thin-film transistor is turned on by a sensing time selecting signal applied from said sensor control line during a period different from the image display period by said pixel, and photoelectric current generated by the sensing of said second thin-film transistor is accumulated as electric charge in said storage capacitor; and said accumulated electric charge is read out on said data line as light detecting current via said first thin-film transistor, and said electric charge is turned to a touching signal after voltage conversion.

Further, the present invention provides the image display unit as described above, wherein there is provided a storage line to connect the other of the electrodes of said storage capacitor, a sensor signal processing circuit is disposed for generating a judging signal to judge whether there has been touching operation or not according to a detection signal of said touching operation on outer side of said pixel area, and said judging signal is a bivalent signal, said judging signal is sent to an upper control circuit of said image display unit and carries out an instruction as set up on coordinates of a touched site on the touch pixel area.

Also, the present invention provides the image display unit as described above, wherein there is provided on the data line a changeover switch to change over between a display signal and a detection signal of the touching operation on said data line connected to said first thin-film transistor to make up said one pixel.

Further, the present invention provides the image display unit as described above, wherein, said sensor control line is commonly used by two pixels adjacent to each other in a direction of alignment of said gate line, and said sensor control line is substituted by said storage line.

Also, the present invention provides the image display unit as described above, wherein the period different from said image display period is a blanking period within one frame period.

Further, the present invention provides the image display unit as described above, wherein said three pixels are red pixel, green pixel and blue pixel, and said one pixel is white pixel.

Also, the present invention provides the image display unit as described above, wherein there is provided another insulating substrate attached on main surface of said insulating substrate with the surface thereof facing to said main surface of said insulating substrate, and a liquid crystal is sealed between said insulating substrate and said another insulating substrate, and there is provided a counter electrode to generate electric field on main surface of said another insulating substrate between said pixel electrode and said insulating substrate, and a liquid crystal is sealed between said pixel electrode and said counter electrode.

Further, the present invention provides the image display unit as described above, wherein a pixel electrode of each of said plurality of pixels is used as the other of electrodes, there is provided an organic EL light emitting layer on upper layer of each of said the other of the electrodes, and the other of the electrodes is formed to cover each of said organic EL light emitting layer, and said organic EL light emitting layer has different light emitting color for each of said plurality of pixels.

In the image display unit according to the present invention, only one light detecting TFT and only one sensor control line are added in addition to the switching TFT, the auxiliary capacitor, the data lines, the gate lines and the storage lines. Accordingly, the decrease of numerical aperture of pixel associated with the incorporation on of the optical sensor in the pixel area can be suppressed. Also, it is possible to avoid the increase of power consumption (and also the power consumption of the backlight in the liquid crystal display panel) caused by the increase in the number of elements.

DETAILED DESCRIPTION OF THE PREFERRED EMBODIMENTS

Detailed description will be given below on the best aspect of the invention referring to the attached drawings.

Embodiment 1

Figure 1:
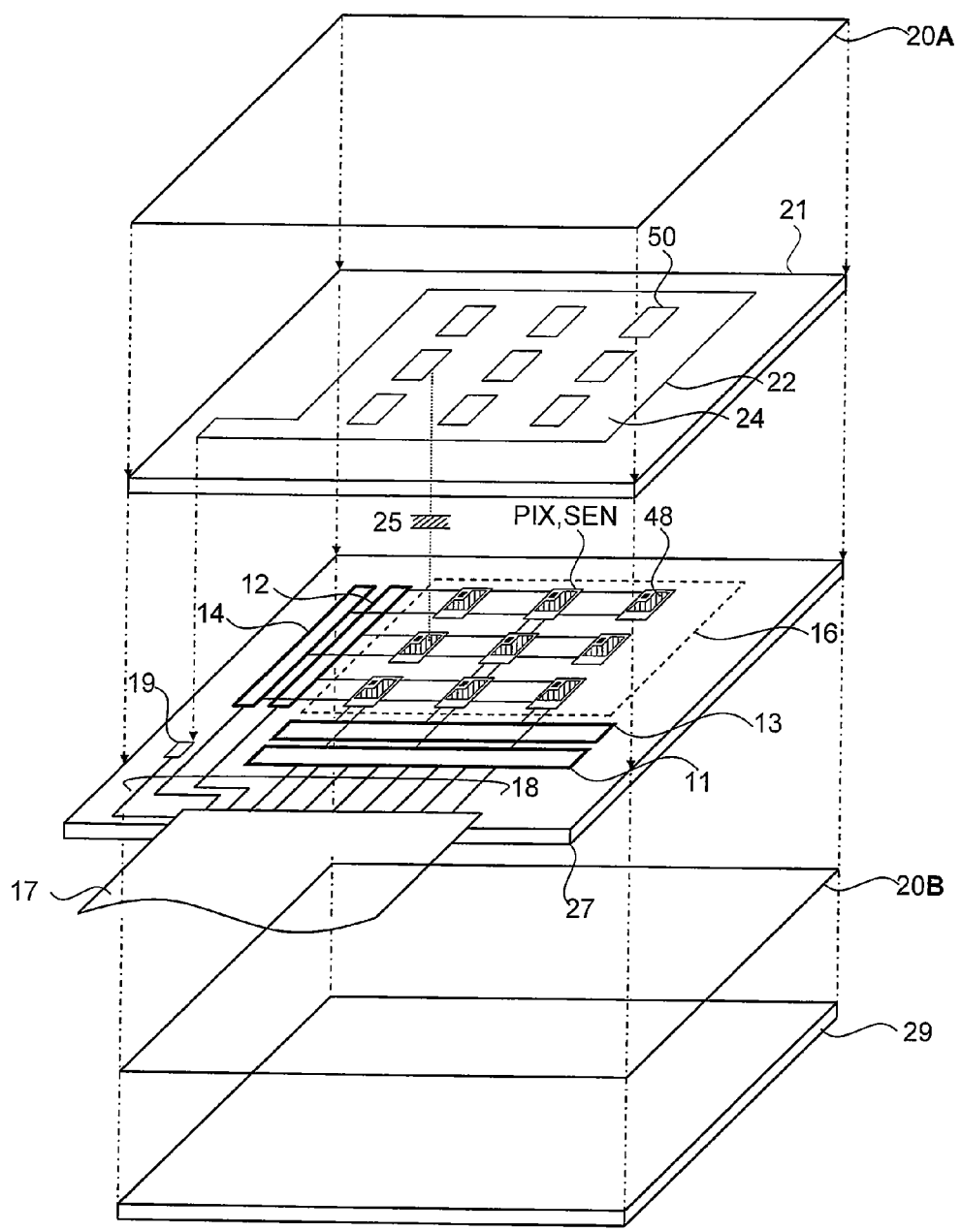
FIG. 1 is a developed perspective view of a liquid crystal display unit with screen input function to explain an Embodiment 1 of the present invention.

FIG. 1 is a developed perspective view of a liquid crystal display unit with screen input function to explain the Embodiment 1 of the invention. In FIG. 1, a display area (a pixel area) 16 where a plurality of pixels (shown by pixel electrodes 48) are arranged in matrix form is disposed on a main surface of a lower glass substrate 27 (i.e. inner surface where a thin-film transistor (TFT) or the like are arranged), which is a first insulating substrate (a TFT substrate). This pixel comprises a pixel unit PIX for display and an optical sensor unit SEN. On the main surface of the glass substrate 27 and on outer side of the pixel area 16, there are provided a gate driver 12 for applying a selection signal to a gate electrode of a switching TFT (to be described later), which makes up the pixel, a sensor driver 14 for applying a sensor control signal to a light detecting TFT (to be described later), a data driver 11 connected to a source electrode or a drain electrode (a source electrode in this case) of the switching TFT, and a sensor signal processing circuit 13 for generating a judging signal to judge whether there is touching or not.

The gate driver 12, the sensor driver 14, the data driver 11, and the sensor signal processing circuit 13 disposed outside are connected to an upper information processing circuit (host computer) via a wiring 18 prepared by patterning on the substrate 27 and a flexible printed board (FPC) 17.

On a main surface of an upper glass substrate 21, which is a second insulating substrate, a plurality of color filters (shown by apertures 50 of pixel) partitioned by a light shielding film (black matrix) 24 are disposed to match each pixel formed on the main surface of the glass substrate 27. A counter electrode 22 is provided on it by allover deposition. A liquid crystal 25 is sealed in a gap between the main surface of the second insulating substrate and the first insulting substrate. On a boundary surface between the pixel electrode 48 and the counter electrode 22 on one side and the liquid crystal 25 on the other side, an orientation film with liquid crystal orientation control ability is disposed, but this is not shown in the figure. The same applies to FIG. 2 and after.

On a surface (observation surface) of the upper glass substrate 21, an upper polarizing plate 20A is attached. On the surface (rear surface) of the lower glass substrate 27, a lower polarizing plate 20B is attached, and these polarizing plates make up together a liquid crystal display panel. Normally, a light absorption axis of the upper polarizing plate 20A and a light absorption axis of the lower polarizing plate 20B are disposed in crossed Nicols arrangement. On a rear surface of the lower glass substrate 27, which constitutes the liquid crystal display panel, a backlight 29 is mounted.

FIG. 1 shows a liquid crystal display unit using a liquid crystal display panel with the counter electrode 22 arranged on the main surface of the upper glass substrate 21 while, in case of a liquid crystal display panel with the counter electrode 22 on the main surface of the lower glass substrate 27, the pixel circuit has the same arrangement except the arrangement and the shape of the electrode.

Figure 2:
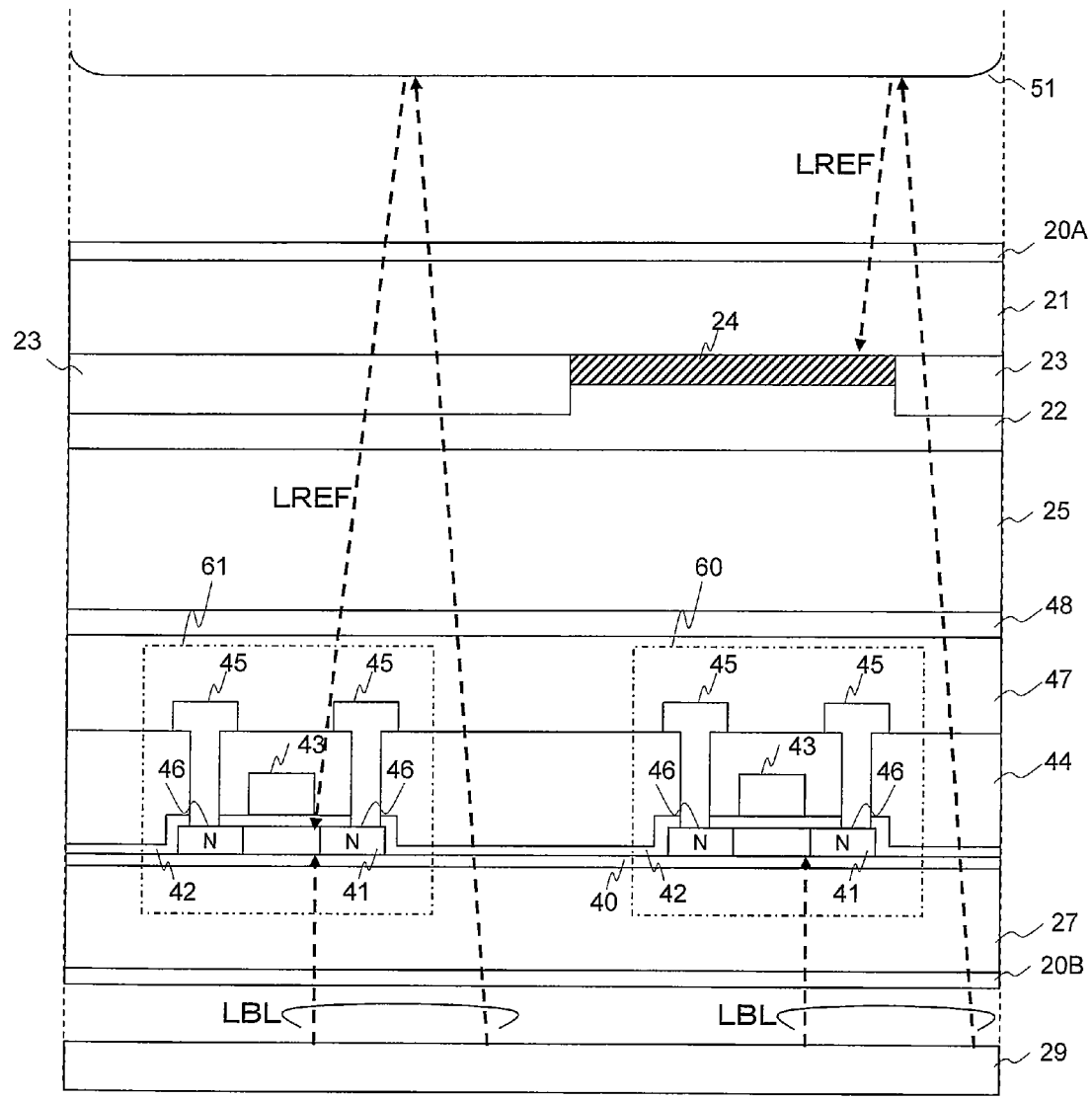
FIG. 2 is a cross-sectional view of one pixel of the liquid crystal display unit with screen input function as shown in FIG. 1 to explain the Embodiment 1 of the invention.

FIG. 2 is a cross-sectional view of one pixel of the liquid crystal display unit with screen input function as shown in FIG. 1 to explain the Embodiment 1 of the invention. The liquid crystal display unit with screen input function comprises an optical sensor (light detecting means) to provide screen input function. This optical sensor is disposed on the main surface of the lower glass substrate 27, and it comprises a combination of a light detecting thin-film transistor (light detecting TFT) 61 and a switching TFT 60. The light detecting TFT 61 and the switching TFT 60 also control the display of pixel.

FIG. 2 shows a condition where a finger 51 or the like (hereinafter referred as "finger") of an operator (user) touches the pixel. The light detecting TFT 61 disposed on the main surface of the lower glass substrate 27 is provided under a color filter 23 arranged on the main surface of the upper glass substrate 21. A light LBL from the backlight 29 is reflected by the finger 51. Then, the light passes through the color filter 23 from the direction of the upper glass substrate 21 as a reflection light LREF and enters the light detecting TFT 61. Also, a part of the light LBL from the backlight 29 enters from lower side of the light detecting TFT.

On the other hand, the switching TFT 60 disposed on the main surface of the lower glass substrate 27 is arranged under the black matrix 24 on the main surface of the upper glass substrate 21. At the switching TFT 60, the reflection light LREF of the light LBL from the backlight 29 as reflected by the finger 51 is shielded by the black matrix 24. As a result, only the light LBL from the backlight coming from the direction of the rear surface enters the switching TFT 60.

Figure 3A:
FIG. 3 is a diagram to explain relation between illuminance of a light to be projected to a thin-film transistor and drain current.
Figure 3B:
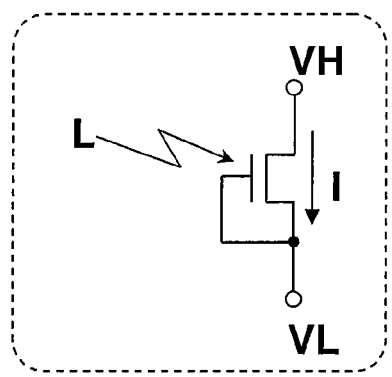

FIG. 3 represents diagrams to explain the relation between illuminance of a light projected to the thin-film transistor (TFT) and a drain current. FIG. 3(a) represents the dependency of the drain current on light amount when the light is projected to TFT. Illuminance Ev of a light L projected to TFT is represented on the axis of abscissa, and the drain current I of TFT is represented on the axis of ordinate. FIG. 3(b) schematically shows the light projected to TFT and the drain current. As shown in FIG. 3(b), by applying high voltage VH on a drain electrode of TFT and low voltage VL on a source electrode of TFT to have the gate and the source connected to diode, a drain current $I_{off}$ is generated by dark current. Also, by the energy of the light when the light L is projected, electrons in the channel of TFT are directly excited from valence band to conduction band, and a drain current I depending on the light amount L flows.

The illuminance is supposed to be 0 when the light is not projected to TFT. When the illuminance of the light L projected to TFT is increased to EV1, EV2 and EV3 respectively, the drain current I increases to $I_{off}$, IEV1, IEV2 and IEV3 in proportion to the illuminance of the light L. The image display unit of the present embodiment of the invention utilizes the characteristics of the current, which flows depending on the amount of the light projected to TFT. By providing the TFT on the glass substrate, input function such as touch panel function can be accomplished.

Figure 4:
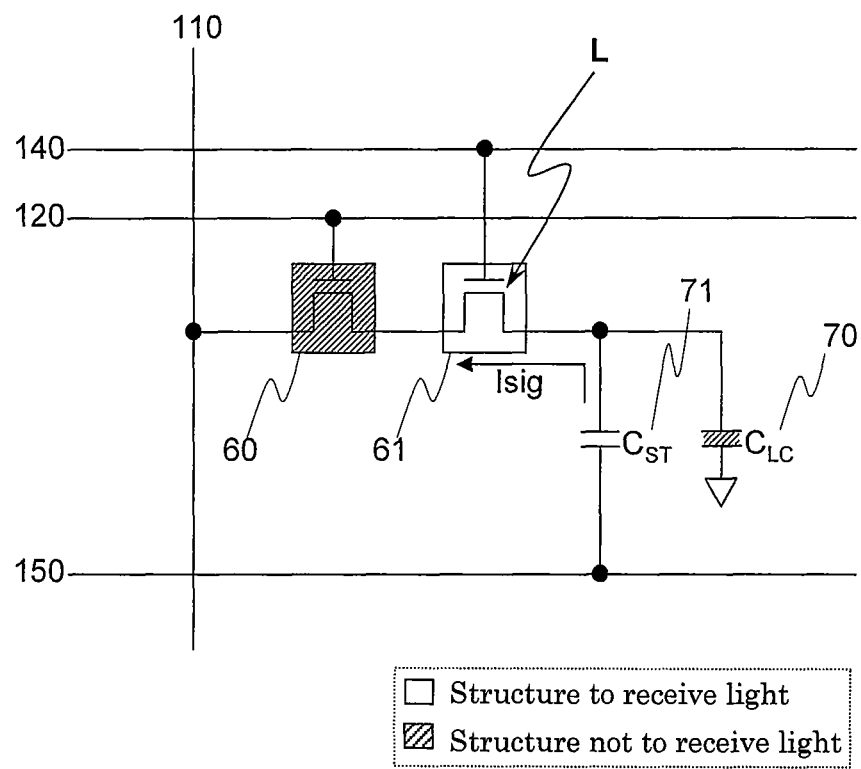
FIG. 4 is an equivalent circuit diagram to explain pixel arrangement of the Embodiment 1 of the invention.

FIG. 4 is an equivalent circuit diagram to explain pixel arrangement in the Embodiment 1 of the invention. In this pixel, the light detecting TFT 61 receiving the light entering the screen of the liquid crystal panel (front surface of the upper glass substrate) is connected in series to the switching TFT 60, which does not receive the light entering from the screen of the liquid crystal display panel because the light is shielded by black matrix. To the source electrode of the light detecting TFT 61, a storage capacitor Cst and a pixel electrode (ITO) of liquid crystal element are connected. The liquid crystal element is represented by the capacity $C_{LC}$. A sensor control line 140 is connected to the gate electrode of the light detecting TFT 61, and a gate line 120 is connected to the gate electrode of the switching TFT 60.

A data line 110 is connected to the drain electrode of the switching TFT 60. A storage line 150 is connected to one end of the storage capacitor Cst, and an image signal is sent to the pixel electrode (ITO) of the liquid crystal element ($C_{LC}$). The light detecting TFT 61 transfers photoelectric current $I_{sig}$ generated by sensing the light to a sensor signal processing circuit (see FIG. 1) via the data line 110. One element of the light detecting TFT 61 and one sensor control line 140 are added in addition to the switching TFT 60, which is required for displaying the image signal, and the storage capacitor Cst, the data line 110, the gate line 120, and the storage line 150. Thus, the light detecting signal of the light detecting TFT 61 is transferred to the sensor signal processing circuit. As a result, the pixel structure can be simplified. The decrease of numerical aperture of pixel due to the incorporation of the optical sensor to the image display unit can be suppressed, and a display image with high illuminance can be maintained.

Figure 5:
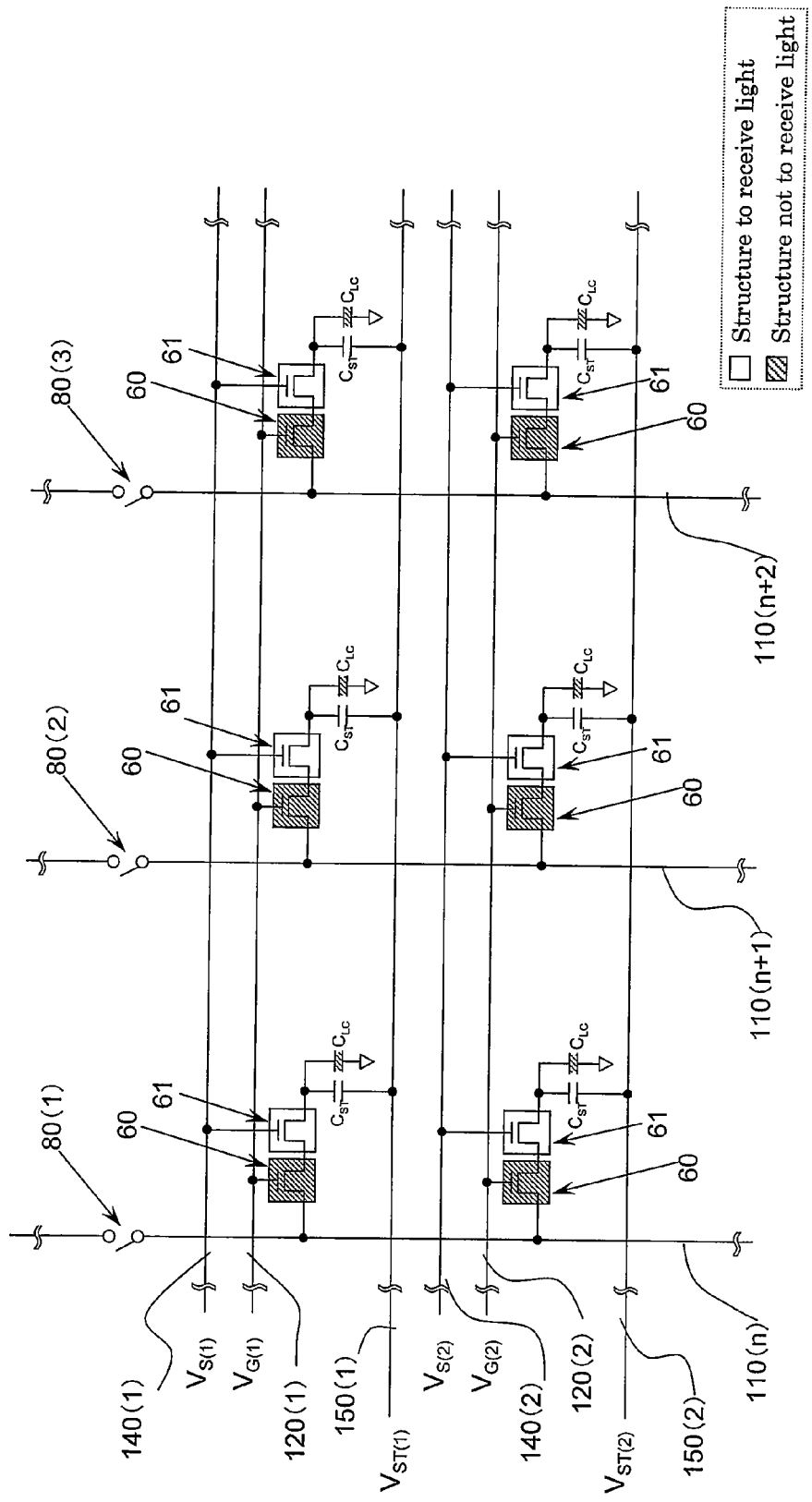
FIG. 5 is a partial equivalent circuit diagram of the Embodiment 1 where the pixel circuit as explained in FIG. 4 is arranged in matrix form.

FIG. 5 is a partial equivalent circuit diagram of the Embodiment 1 where the pixel circuit is arranged in matrix form as explained in FIG. 4. To facilitate the explanation, the arrangement in matrix form of 3×2 pixels is shown here. In FIG. 5, the pixel circuit of the arrangement as shown in FIG. 4 is disposed in matrix form, and changeover switches 80 (n), 80 (n+1), 80 (n+2) are connected to data lines 110 (n), 110 (n+1), and 110 (n+2) respectively. By turning on or off these changeover switches 80 (n), 80 (n+1), and 80 (n+2), the transmission of a driving signal and an image signal sent from the gate driver and the data driver (to be described later) is changed over to the transmission of the photoelectric current $I_{sig}$ to the sensor signal processing circuit as described later.

Figure 6:
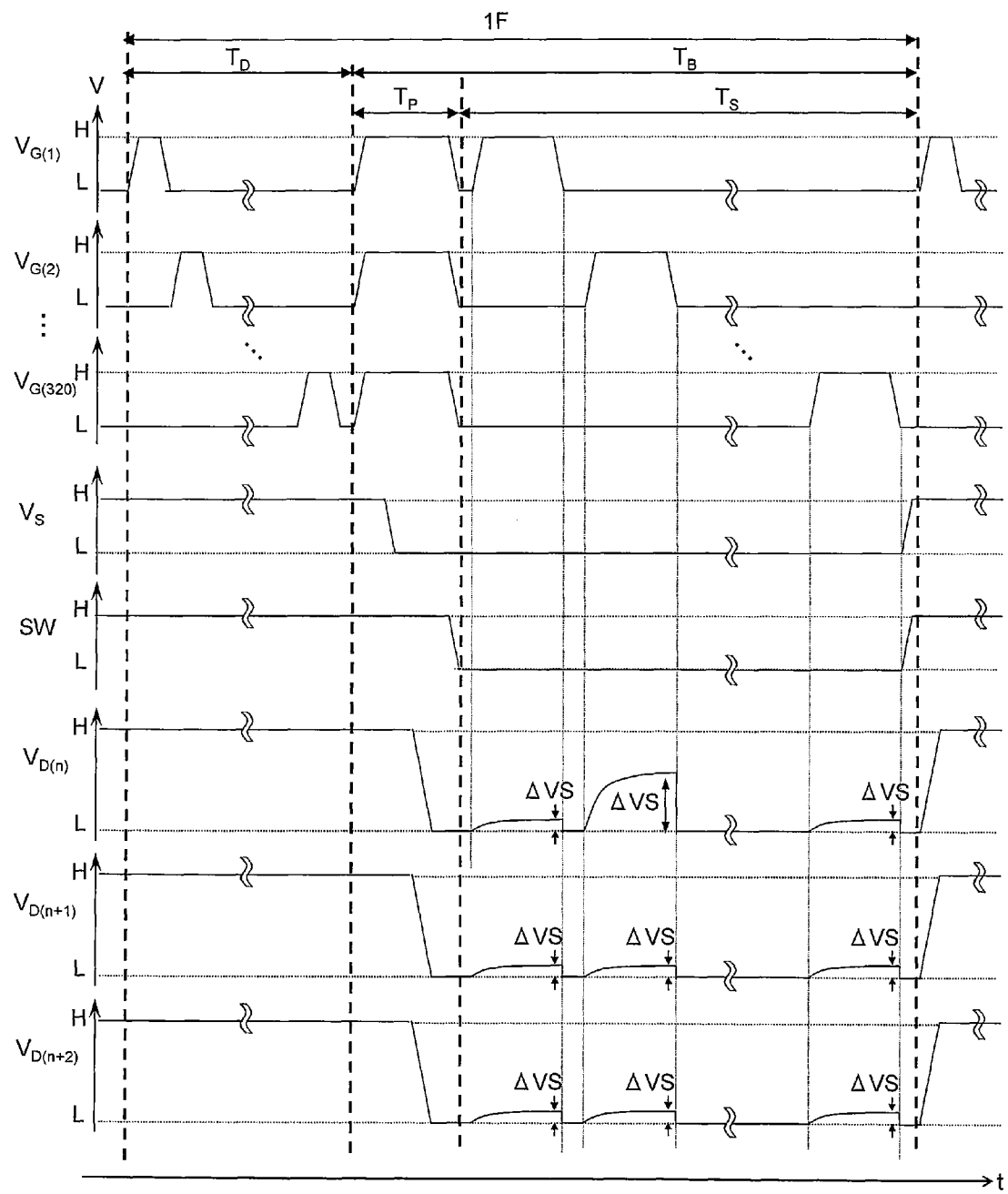
FIG. 6 is a drive timing diagram of the pixel circuit in the Embodiment 1 of the invention.

FIG. 6 is a diagram to show drive timing of the pixel circuit in the Embodiment 1 of the invention. Here, to facilitate the explanation, it is assumed that the resolution is QVGA (240; R, G, B×vertical). In the image display unit, an image signal for one screen is outputted normally within one frame period 1F of 60 Hz. The one frame period consists of a display period (time) $T_D$ and a blanking period (time) $T_B$. The display period is a period, during which control signals (scan signals) of VG (1) to VG (320) are applied the gate lines 120 (1)-120 (320) and image signals VD (n), VD (n+1) and VD (n+2) are inputted to the data lines 110 (n), 110 (n+2) and 110 (n+2) respectively. The blanking period $T_B$ is a period, during which it is retraced from pixel 320 to pixel 1 without displaying the image. The light detecting operation (light sensing operation) in the Embodiment 1 is performed during the blanking period $T_B$.

The blanking period $T_B$ is divided to two periods: a precharge period $T_P$ to initialize the potential between the light detecting TFT 61 and the storage capacitor Cst, and a light sensing period $T_S$, during which the photoelectric current $I_{sig}$ of the light detecting TFT 61 is generated and it is transmitted to the light detection signal processing circuit. First, description will be given on the display period $T_D$.

The scan signals VG (1) to VG (320) to be applied to the gate signal are turned from low level to high level respectively, and these signals sequentially scan from the pixel (pixel of 1st line) belonging to the gate line 120 (1) to the pixel (pixel of 320th line) belonging to the gate line 120 (320). In this case, the voltage VS applied on the sensor control line 140 is always on high level (H), and the light detecting TFT 61 is turned on.

The image signals VD (n), VD (n+1), and VD (n+2) are supplied to the data lines 110 (n), 110 (n+1), and 110 (n+2) respectively from the data driver, and images based on these image signals are displayed on the screen.

Next, description will be given on the pre-charge period $T_P$. In the pre-charge period $T_P$ to follow the display period $T_D$, the scan signals VG (1) to VG (320) to be applied on the gate lines 120 (1)-120 (320) and the voltage VS applied on the sensor control line 140 are always maintained on high level (H). By inputting voltage of high level (H) instead of the image signals VD (n), VD (n+1), and VD (n+2) to all of the data lines from the data driver, the potential difference between auxiliary capacitors is initialized. Next, the voltage applied on the sensor control line 140 and the voltages VD (n), VD (n+1), and VD (n+2) applied on the data lines are turned to low level (L), and low (L) voltage is applied on the drain of the light detecting TFT 61. A drain current to match the amount of the received light amount flows, and the pre-charge period is terminated.

Next, the light sensing period will be described. The voltage VS applied on the sensor control line 140 is maintained at low level (L). When the changeover signals SW of the changeover switches 80 (n), 80 (n+1), and 80 (n+2) are turned from high level (H) to low level (L), the data lines 110 (n), 110 (n+1), and 110 (n+2) are separated from the data driver and are conducted to the sensor signal processing circuit. When the voltages VG (1)-VG (320) of the gate lines 120 (1)-120 (320) are turned from high level (H) to low level (L), the drain current generated through the sensing of the light detecting TFT 61 during this period is read as the signals VD (n), VD (n+1) and VD (n+2) on the data lines 110 (n), 110 (n+1), and 110 (n+2), and this is transmitted to the sensor signal processing circuit as the potential difference $\Delta VS$ after voltage conversion.

Also, the signals VG (1)-VG (320) on the data lines 110 (n), 110 (n+1), and 110 (n+2) respectively scan over the first pixel to the 320th pixel. In this case, the stronger the intensity of the light entering the light detecting TFT is, the more the potential difference $\Delta VS$ increases. At the sensor signal processing circuit (to be described later in connection with FIG. 9), it is judged by this potential difference $\Delta VS$ whether the screen has been touched by the finger or not.

Figure 7:
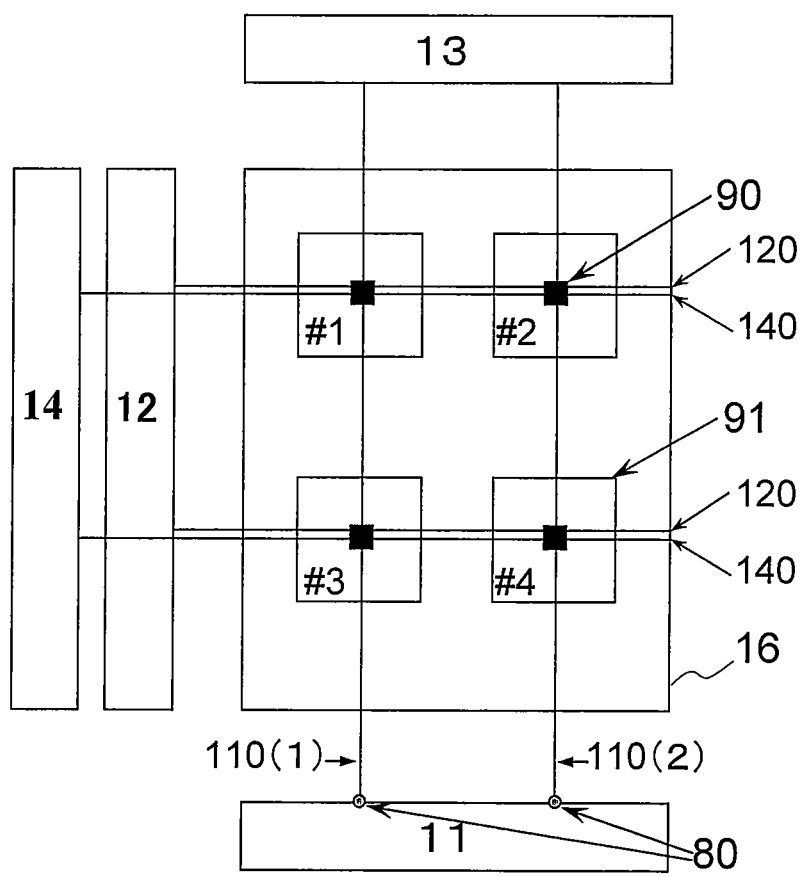
FIG. 7 is a diagram to explain entire circuit configuration of an image display unit of the invention.

FIG. 7 is a diagram to explain the entire circuit configuration of the image display unit of the invention. On the glass substrate, which is a TFT substrate, there are provided a gate driver 12, a data driver 11, a sensor driver 14, and a sensor signal processing circuit 13. On the pixel area (display area) 16, a plurality of data lines 110 (1) and 110 (2) are disposed in a direction perpendicular to the paper surface of FIG. 7 from the data driver 11, and these are connected to the data driver 11 via the changeover switch 80. A plurality of gate lines 120 from the gate driver 12 and a plurality of sensor control lines 140 from the sensor driver 14 are disposed in horizontal direction on the paper surface. FIG. 7 shows a condition where a certain predetermined image is displayed on the display area 16. The displays of 4 touch buttons of "#1", "#2", "#3", and "#4" are shown. The pixel configuration as shown in FIG. 4 is incorporated in a pixel region, which corresponds to the center of the four touch buttons. The signal voltage of the optical sensor in the display area 16 is transmitted to the sensor signal processing circuit 13.

Figure 8:
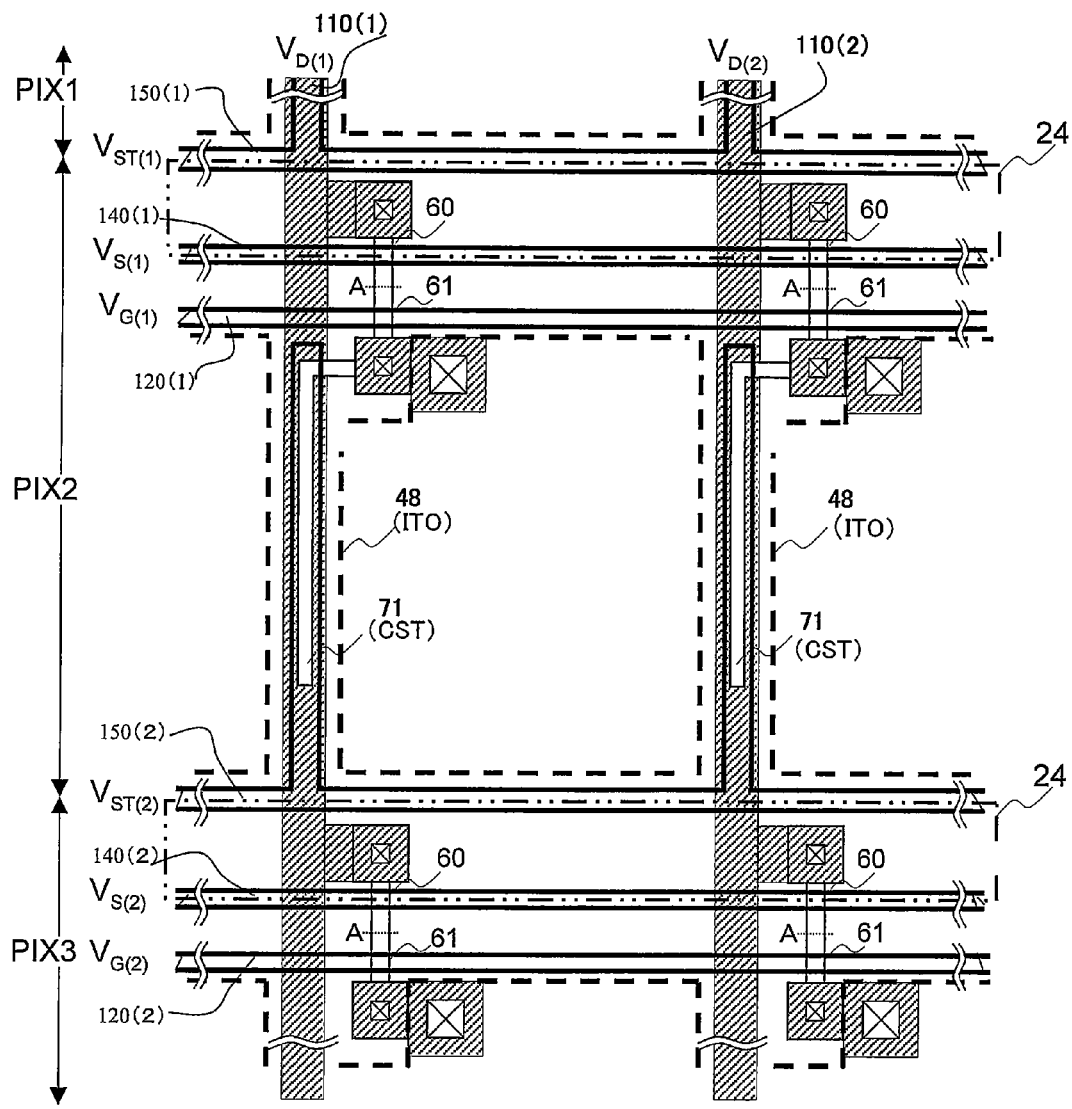
FIG. 8 is a drawing to show an example of layout on a TFT substrate of the Embodiment 1 of the invention.

FIG. 8 is a drawing to show an example of layout on the TFT substrate in the Embodiment 1 of the invention. The source electrode and the drain electrode of each TFT are made of polysilicon layers as shown in FIG. 2. The data lines 110 (1) and 110 (2), the sensor control lines 140 (1) and 140 (2), the capacitor lines (storage lines) 150 (1) and 150 (2), and the gate electrode of each TFT are made of gate metal layers. The data lines 110 (1) and 110 (2) are made of metal line layers. In FIG. 8, the symbols PIX1, PIX2, PIX3 . . . each represents an area of one pixel.

The display electrode 48 (ITO) occupies most of the pixel area (e.g. at PIX2), and it is connected to a metal line layer, which makes up the source-drain electrodes of the light detecting TFT 61 via a contact hole 49. One of the source-drain electrodes in the light detecting TFT 61 is to one of the source-drain electrodes of the switching TFT 60 in series. Accordingly, there is no need to provide a contact hole at a connecting point A of these two, and the layout area can be reduced in size.

The black matrix 24 is disposed on a color filter substrate of the switching TFT 60. Further, under each of the metal line layers of the data lines 110 (1) and 110 (2), a storage capacitor Cst 71 is arranged by a gate metal layer and a semiconductor film (polysilicon layer) of the light detecting TFT 61.

Figure 9:
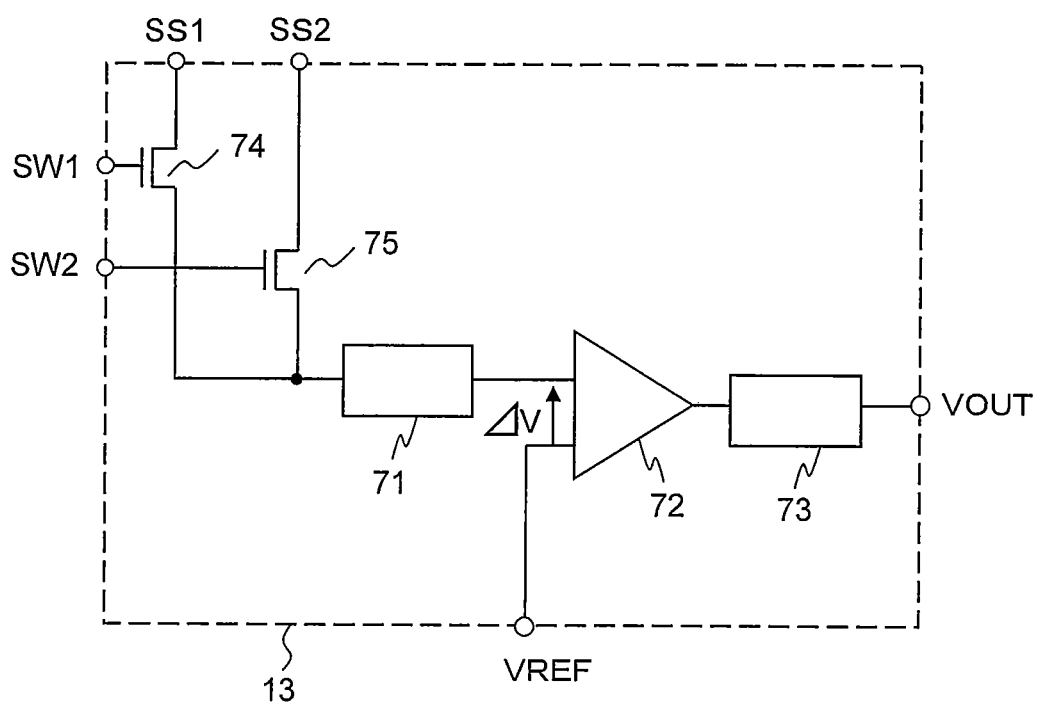
FIG. 9 is a drawing to explain an example of arrangement of a sensor signal processing circuit in the Embodiment 1 of the invention.

FIG. 9 is a diagram to explain an example of arrangement of a sensor signal processing circuit in the Embodiment 1 of the invention. The sensor signal processing circuit constitutes a comparator circuit. Terminals SS1 and SS2 connected to the data lines 110 (1) and 110 (2) respectively are connected to a sample hold circuit 71 via a selection switch 74 and a selection switch 75. The terminals SW1 and SW2 are connected respectively to the gate electrodes of TFT, which make up the selection switches 74 and 75 respectively. A signal is sent from the sensor driver to control the selection switches 74 and 75, and the data lines 110 (1) and 110 (2) to be inputted to the sample hold circuit 71 are selected.

When the signal voltage $\Delta VS$ generated on the data lines 110 (1) and 110 (2) is inputted to the sample hold circuit 71, sampling is performed during a predetermined period. The sampling data is maintained, and an amplifier 72 amplifies the difference $\Delta V$ between the sampling data and the reference voltage VREF during this period, and this is transmitted to a latch circuit 73. Based on a signal sent from the amplifier circuit 72, the latch circuit 73 ultimately issues a bivalent digital judging signal VOUT.

Figure 10:
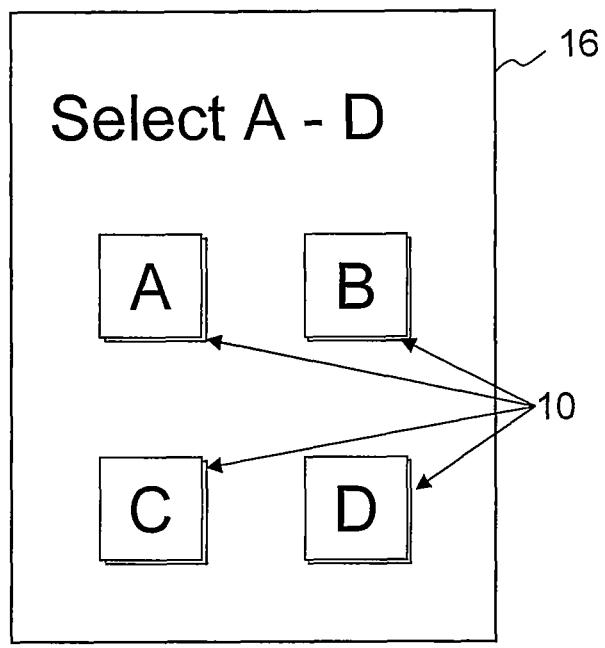
FIG. 10 is a drawing to explain a display screen when touching function is used in the Embodiment 1 of the invention.

FIG. 10 is an illustration to show a display screen with touching function used in the Embodiment 1 of the invention. FIG. 10 shows a condition where a certain predetermined image is displayed on the display area 16. Together with the characters "Select A-D", switch-like displays 10 given as "A", "B", "C" and "D" respectively are displayed. This is the condition where selective touching input of the switches "A", "B", "c", and "D" by the user is awaited. When the switch-like displays given as "A", "B", "C", and "D" on the screen are touched by the user, the signal voltage $\Delta VS$ of the light detecting TFT 61 in the pixel circuit of FIG. 4 is transmitted to the sensor signal processing circuit 13, and it is judged by the bivalent judging signal VOUT whether the user has touched or not.

Figure 11:
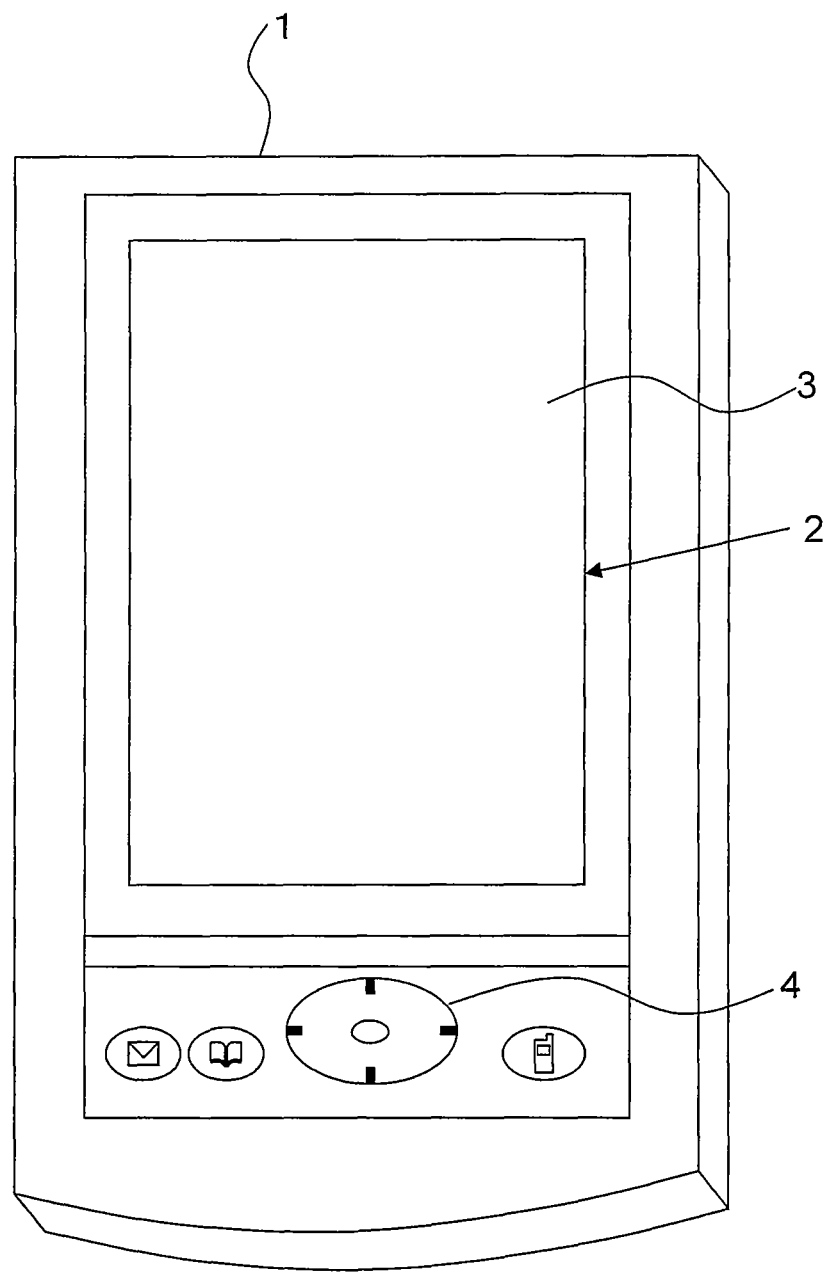
FIG. 11 is a drawing to show an example of an electronic device for mobile, to which the image display unit of the present invention is applied.

FIG. 11 is a drawing to show an example of an electronic device for mobile, on which the image display unit of the present invention is applied. This electronic device for mobile is provided with an image display unit with a display screen 3 and has a cross-shaped key 4 on an operation unit. By applying the image display unit with screen input function according to the present invention to the electronic device for mobile, icon or the like displayed on the display screen of the image display unit is touched by the finger of the user. As a result, it is possible to obtain an electronic device for mobile, which has lightweight design and thin-type construction and gives bright screen, and there is no need to install special-purpose touch panel module on the display screen as practiced in the past. An operation key such as the cross-shaped key 4 may be displayed in the screen.

Figure 12:
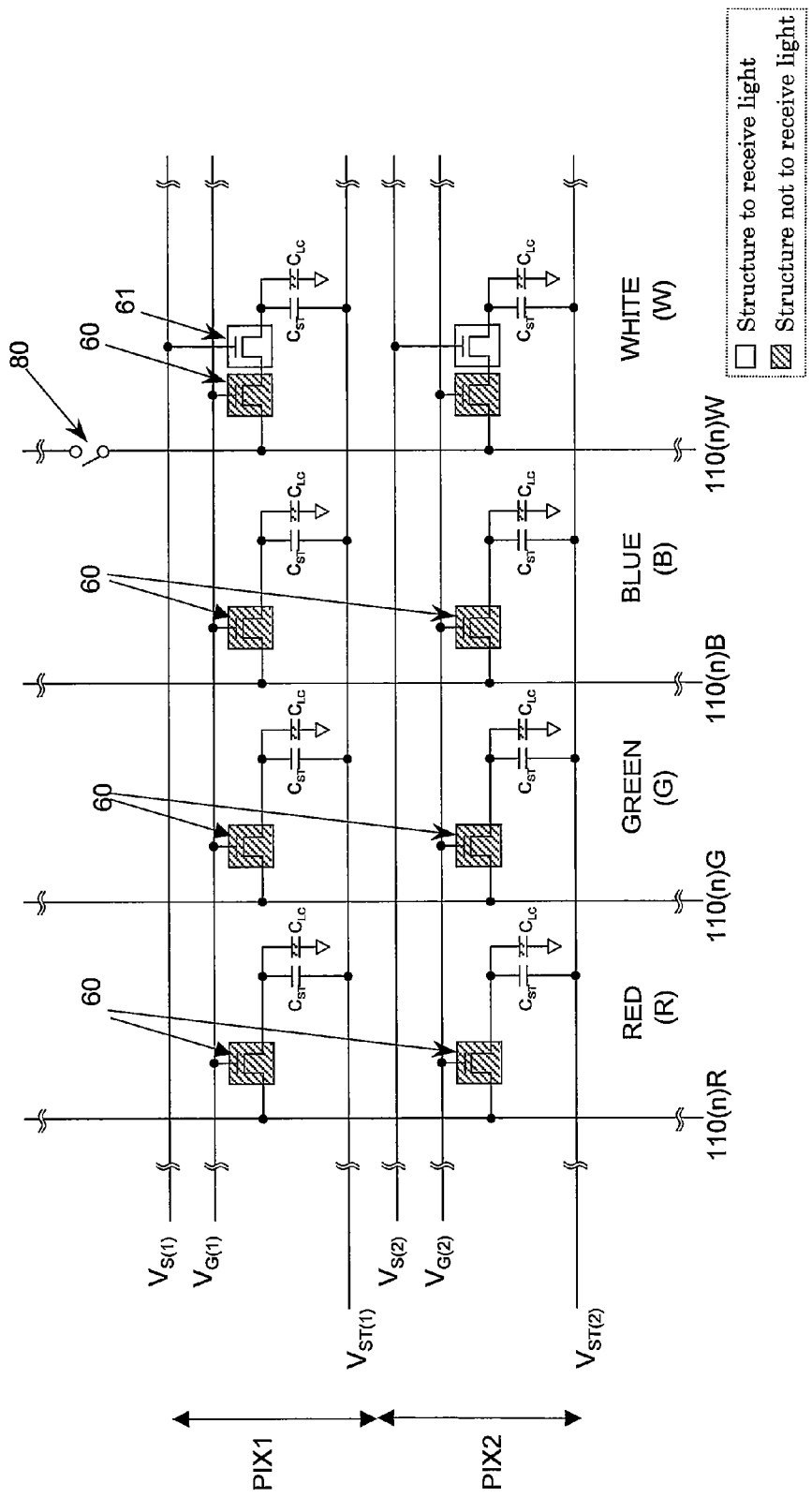
FIG. 12 is a partial equivalent circuit diagram of a pixel circuit arranged in matrix form in an Embodiment 2 of the invention.

FIG. 12 is a partial equivalent circuit diagram where pixel circuits are arranged in matrix form in the Embodiment 2 of the present invention. In the Embodiment 2, one color pixel is composed of 4 pixels of "RED", "GREEN", "BLUE" and "WHITE" respectively. In this image display unit, the pixel circuit shown in FIG. 4 is incorporated in the "WHITE" pixel. In other points, the Embodiment 2 has the same arrangement as the Embodiment 1.

Figure 13:
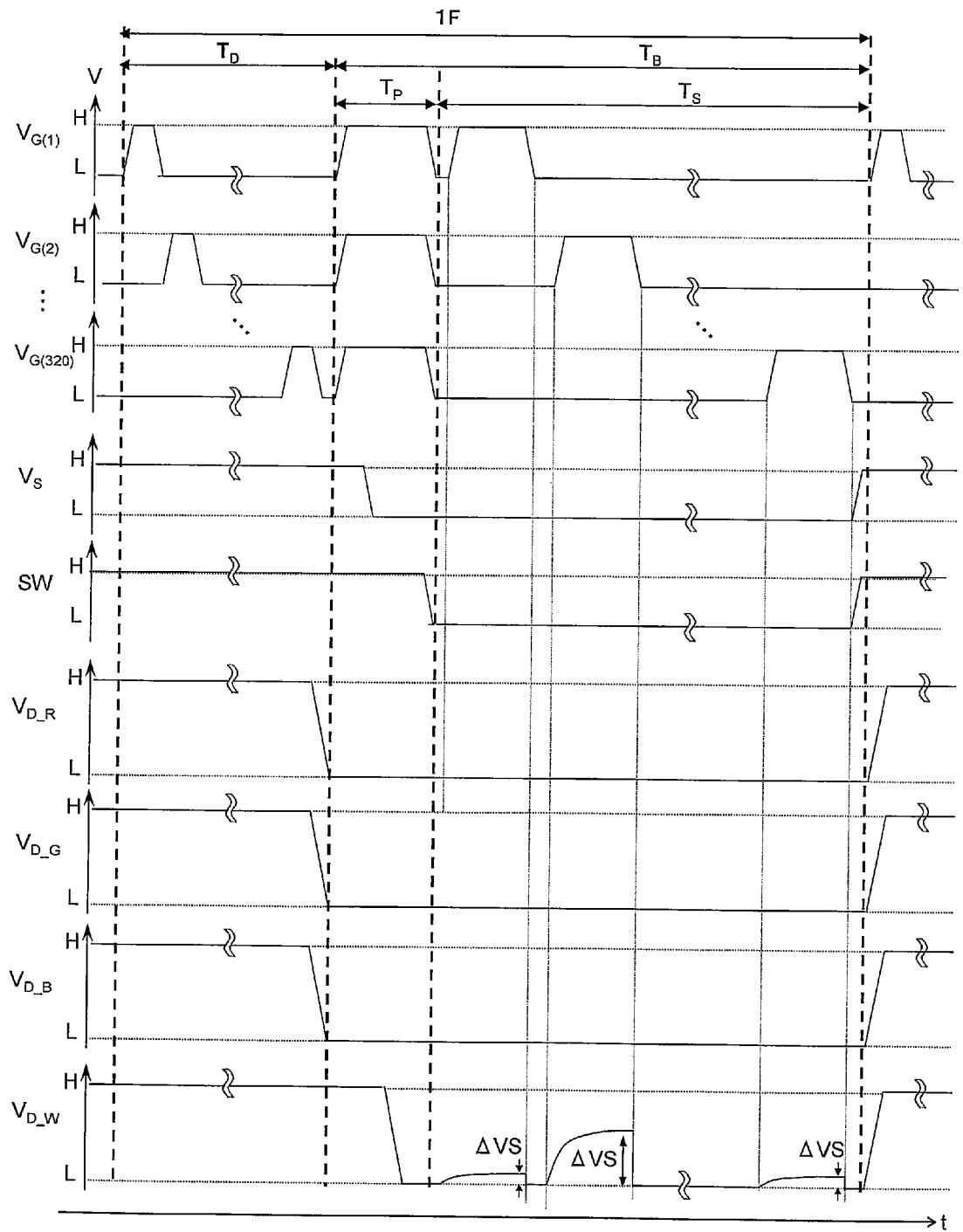
FIG. 13 is a diagram to show drive time to explain operation of the pixel circuit of the Embodiment 2 of the invention.

FIG. 13 is a diagram of drive timing to explain operation of the pixel circuit of the Embodiment 2 of the invention. The "WHITE" pixel operates in the same manner as the drive timing shown in FIG. 6. As for the "RED", "GREEN", and "BLUE" pixels, the driving is the same as the driving of a normal type liquid crystal display unit, and detailed description is not given here as in the case of FIG. 12.

Figure 14:
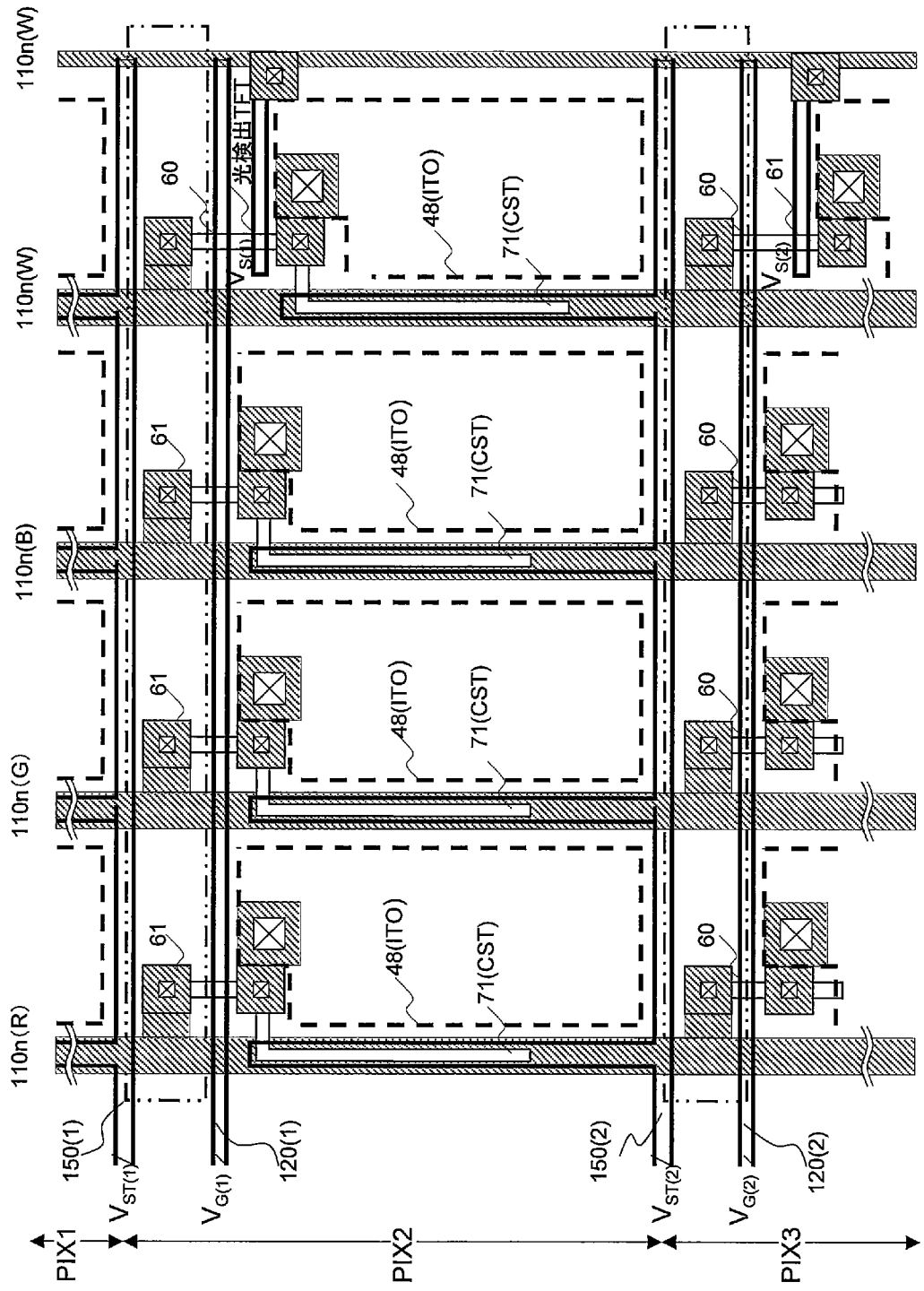
FIG. 14 is a drawing to explain an example of layout on a TFT substrate in the Embodiment 2 of the invention.

FIG. 14 is a drawing to explain an example of layout on the TFT substrate in the Embodiment 2 of the present invention. Only the "WHITE" pixel has the same arrangement as the example of layout in the Embodiment 1 as shown in FIG. 8.

Figure 15:
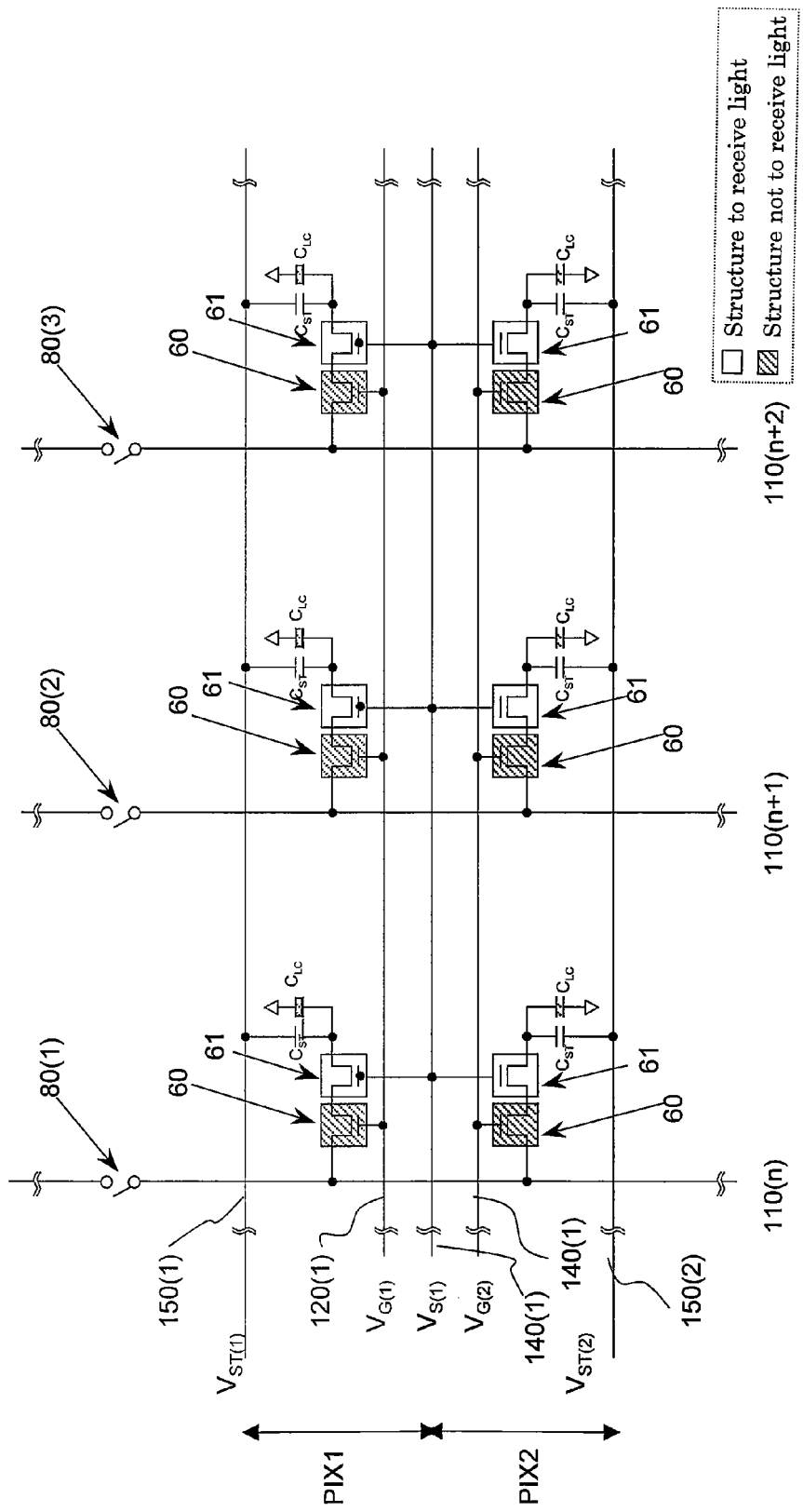
FIG. 15 is a partial equivalent circuit diagram where the pixel circuit is arranged in matrix form in an Embodiment 3 of the invention.

FIG. 15 is a partial equivalent circuit diagram where the pixel circuit of the Embodiment 3 of the invention is arranged in matrix form. FIG. 15 has the same arrangement as in the Embodiment 1 shown in FIG. 5 except that the sensor line 140 (1) is commonly used by the pixel PIX1 and the pixel PIX2. By commonly using the sensor line, the number of the lines per pixel can be reduced and numerical aperture of the pixel in the image display unit with optical sensor incorporated in it can be improved further.

Figure 16:
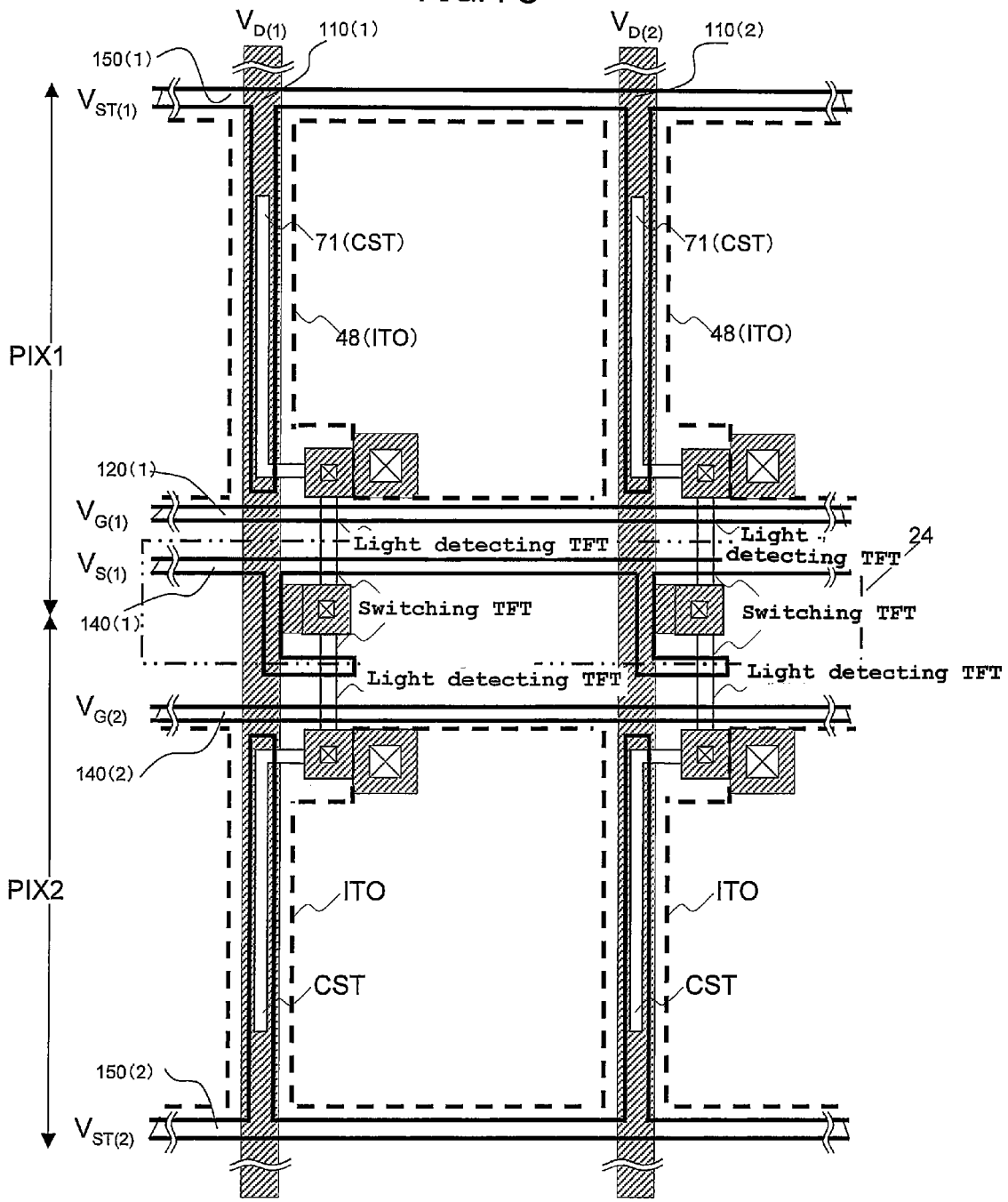
FIG. 16 is a drawing to explain an example of layout on a TFT substrate in the Embodiment 3 of the invention.

FIG. 16 is a drawing to explain an example of layout on the TFT substrate in the Embodiment 3 of the invention. In the Embodiment 3, the pixel PIX1 and the pixel PIX2 are symmetrically laid out in up-to-bottom direction in the extending direction of the data line. By such arrangement, a contact portion with the data line 110 of the switching TFT 60 can be commonly used. Also, together with the common use of the switch line 140, the number of the lines per pixel can be reduced in comparison with the Embodiment 1, and numerical aperture of pixel in the image display unit with optical sensor incorporated in it can be improved further.

Figure 17:
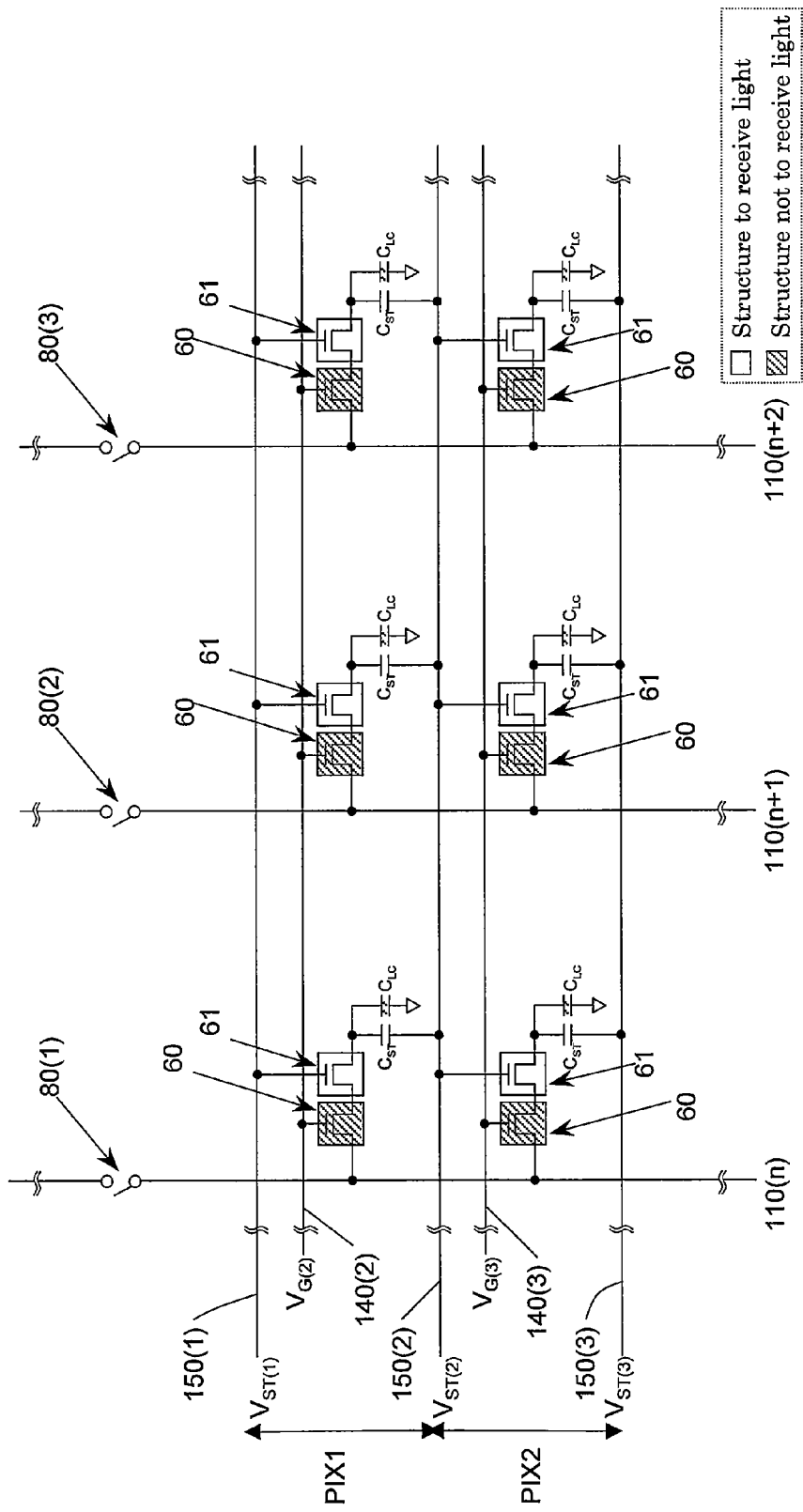
FIG. 17 is a partial equivalent circuit diagram of the pixel circuit arranged in matrix form in an Embodiment 4 of the image display unit of the present invention.

FIG. 17 is a partial equivalent circuit diagram where the pixel circuit in the Embodiment 4 of the invention is arranged in matrix form. Compared with the Embodiment 1, the sensor lines 150 (1), 150 (2), and 150 (3) are substituted by a storage line (or the storage line is substituted respectively by the sensor line), and a sensor line 150 positioned upstream on the data line is connected to the gate electrode of the light detecting TFT 61 of the pixel PIX2. In other points, it has the same arrangement as the Embodiment 1 shown in FIG. 5. Because one of either the storage line or the sensor line is not needed, the number of lines per pixel can be reduced in comparison with the Embodiment 2, and numerical aperture of pixel in the image display unit with optical sensor can be improved further.

Figure 18:
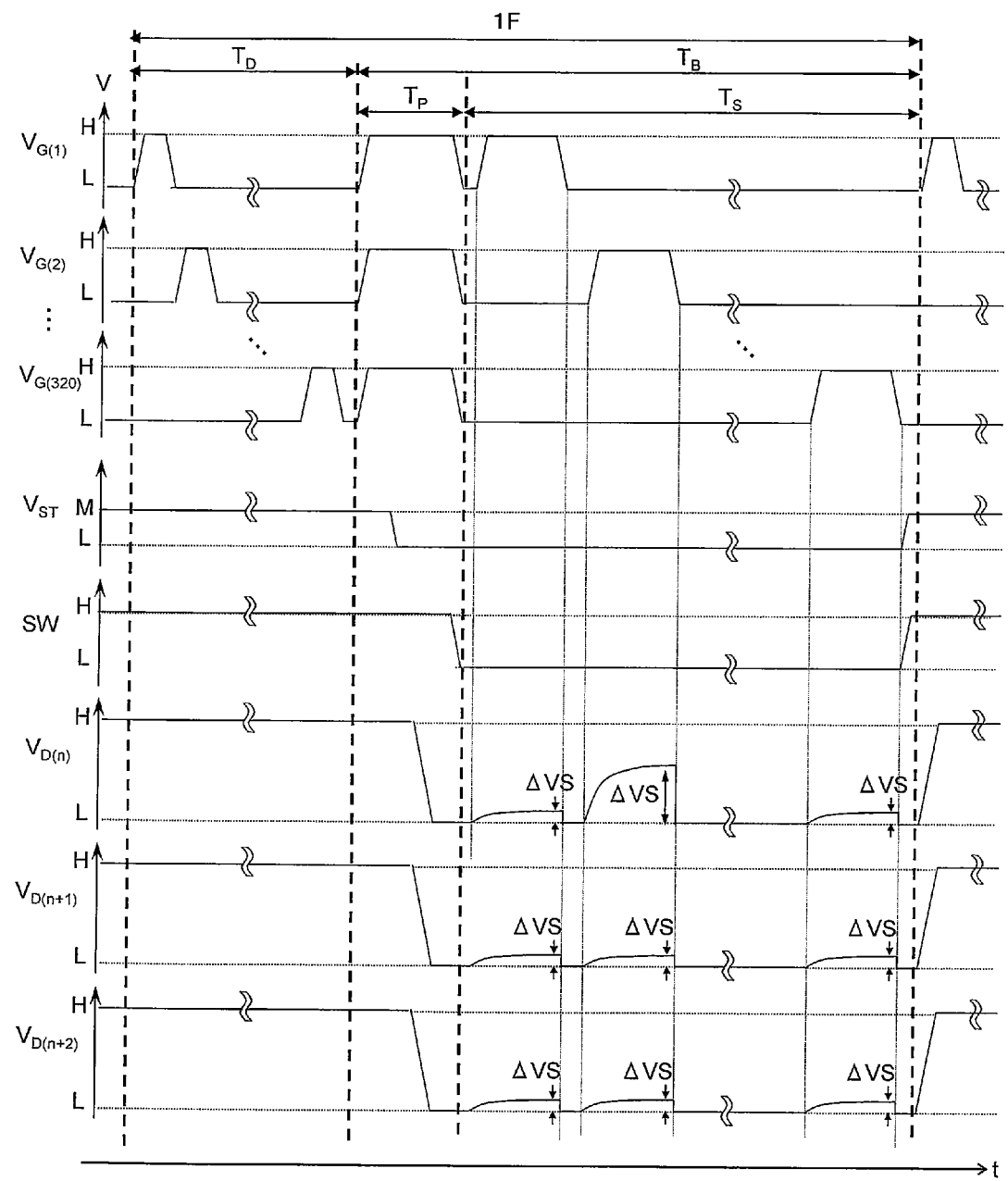
FIG. 18 is a diagram to show drive timing to explain operation of the pixel circuit in the Embodiment 4 of the invention.

FIG. 18 is a diagram of the drive timing to explain operation of the pixel circuit in the Embodiment 4 of the invention. The drive timing shown in FIG. 18 is the same as the drive timing of the Embodiment 1 shown in FIG. 6 except that the voltage $V_{ST}$ applied on the storage line 150 is the same as the drive timing of the voltage VS applied on the sensor control line 140 shown in FIG. 6.

Figure 19:
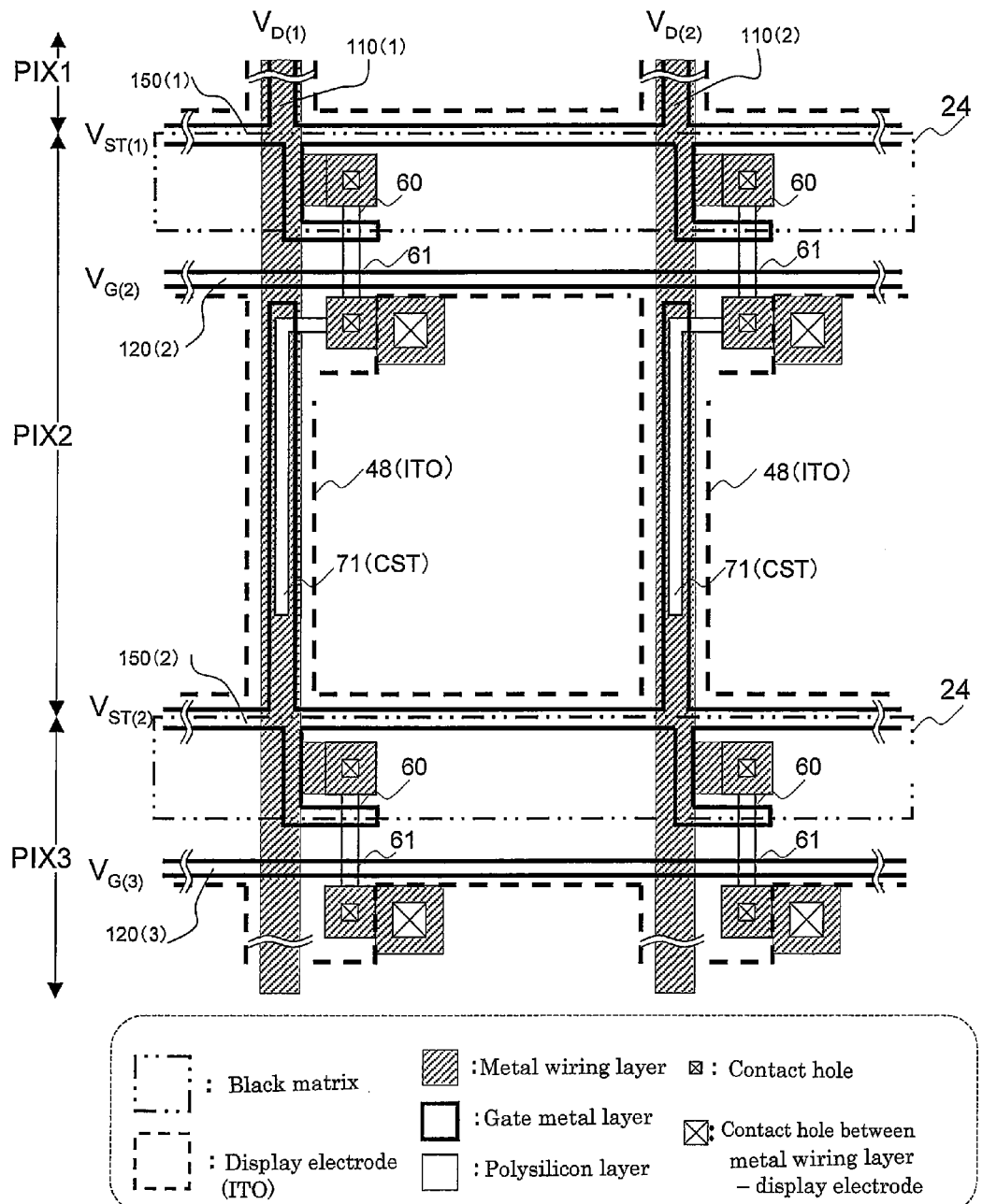
FIG. 19 is a drawing to explain an example of layout on a TFT substrate in the Embodiment 4 of the invention.
Figure 20:
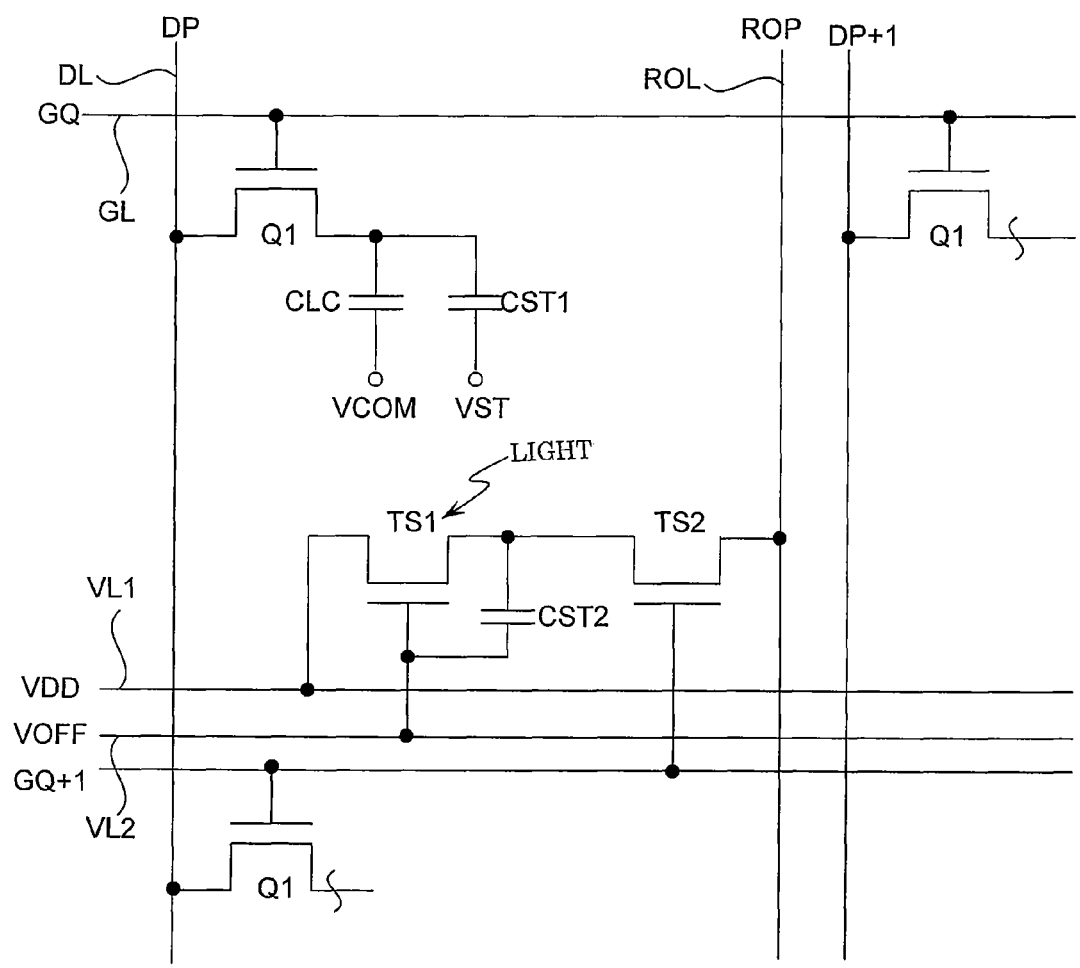
FIG. 20 is an equivalent circuit diagram to explain pixel arrangement of a conventional example of a general type liquid crystal display panel where an optical sensor is provided in each pixel.

FIG. 19 is a drawing to explain an example of layout on the TFT substrate in the Embodiment 4 of the invention. In the Embodiment 4, the application voltage VS on the sensor control line 140 can be reduced in comparison with the Embodiment 3 shown in FIG. 16. Accordingly, the number of lines per pixel can be reduced further compared with the Embodiment 3, and numerical aperture of the pixel in the image display unit with optical sensor can be improved further.

The present invention is applied to the liquid crystal display unit in each of the Embodiments as described above, while the present invention can also be applied on an image display unit based on other concept of display using the TFT substrate as explained in each of the embodiments as described above. For instance, the invention can also be applied on an organic EL display unit. In case of the organic EL display unit, the pixel electrode is used as one of the electrodes, and a bank is formed to determine the opening area of the pixel. On inner side surrounded by the bank, an organic EL light emitting layer is laminated on an upper layer of one of the electrodes. Further, the other of the electrodes is deposited to cover the upper layer. A light-absorbing insulating material is used as the bank to give black matrix function.

In case of the organic EL display unit, the switching TFT is disposed on an area concealed by the bank in the serial circuits of the switching TFT and the light detecting TFT on the TFT substrate, and the light detecting TFT is provided on the opening area of pixel so that the same operation as the liquid crystal display can be performed. The generation of a detection signal for touching operation and a sensor signal processing to generate the judging signal are the same as described in the Embodiments 1 to 4 as given above.

Figure 21:
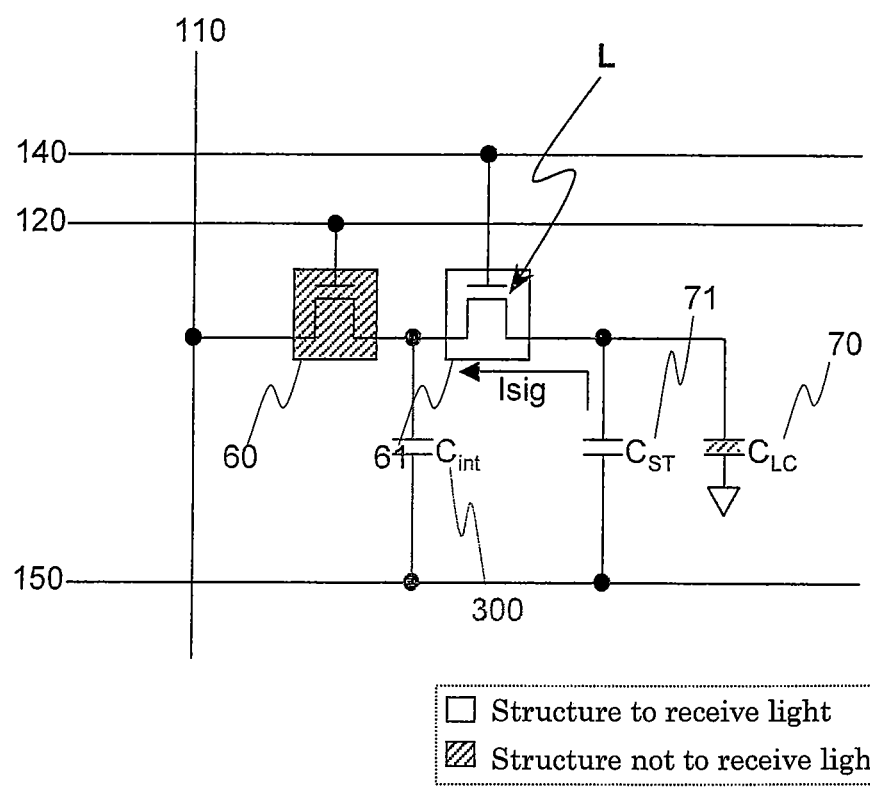
FIG. 21 is a transformation example to explain pixel arrangement of Embodiment 1 of the invention, FIG. 4.

FIG. 21 shows a variation of the pixel arrangement in the Embodiment 1 of the invention as shown in FIG. 4. One of the electrodes of an optical signal cumulative capacitor $C_{INT}$ shown in FIG. 4 is connected between the drain electrode of the light detecting TFT 61 and the drain electrode of the switching TFT 60. The other of the electrodes is connected to the storage line 150, and the optical signal cumulative capacitor $C_{INT}$ is connected in parallel to the storage capacitor Cst. By arranging the optical signal cumulative capacitor $C_{INT}$, the amount of the photoelectric current of the light detecting TFT 61 accumulated in the pixel can be increased, and the signal can be increased.

The invention claimed is:

1. An image display unit with screen input function for inputting information by touching operation to a pixel area comprised of a plurality of pixels on a screen formed on a first insulating substrate, said image display unit comprising, for each of said plurality of pixels:
    a first thin-film transistor shielded from projection of light coming from the direction of a pixel surface, and a second thin-film transistor connected in series with the first thin-film transistor and not shielded from projection of light coming from the direction of the pixel surface;
    a gate electrode of said first thin-film transistor being connected to an associated gate line;
    a gate electrode of said second thin-film transistor being connected to an associated sensor control line;
    a drain electrode or a source electrode of said first thin-film transistor being connected to an associated data line; and
    a storage capacitor having a first electrode connected to a source electrode or a drain electrode of said second thin-film transistor and to a first pixel electrode of said pixel,
    wherein said second thin-film transistor is turned on by a sensing time selecting signal from said sensor control line during a period different from an image display period of said pixel, and photoelectric current generated by projection light sensing of said second thin-film transistor is accumulated as electric charge in said storage capacitor, and wherein said accumulated electric charge is read out on said data line as light detecting current via said first thin-film transistor, and, after voltage conversion, said electric charge is provided as a detection signal of said touching operation.

2. The image display unit with screen input function according to claim 1, wherein a second electrode of said storage capacitor is connected to a storage line.

3. The image display unit with screen input function according to claim 1, further comprising a sensor signal processing circuit disposed outside said pixel area to generate a judging signal to judge whether said touching operation has occurred based on the detection signal of said touching operation.

4. The image display unit with screen input function according to claim 3, wherein said judging signal is a bivalent signal, and wherein said judging signal is sent to an upper control circuit of said image display unit to carry out an instruction based on coordinates of a touched site on the pixel area.

5. The image display unit with screen input function according to claim 1, further comprising a changeover switch on the data line to change between a display signal and the detection signal of said touching operation.

6. The image display unit with screen input function according to claim 1, wherein said sensor control line is commonly used by two of said pixels which are adjacent to each other in a direction of alignment of said gate line.

7. The image display unit with screen input function according to claim 1, wherein said sensor control line for one pixel is also operative as a storage line for a different pixel.

8. The image display unit with screen input function according to claim 1, wherein said period different from said image display period is a blanking period within a frame period.

9. The image display unit with screen input function according to claim 1, further comprising a second insulating substrate attached to a main surface of said first insulating substrate, with a main surface thereof facing said main surface of said first insulating substrate, wherein liquid crystal is sealed between said first insulating substrate and said second insulating substrate.

10. The image display unit with screen input function according to claim 9, further comprising a counter electrode to generate an electric field on the main surface of said second insulating substrate between said first pixel electrode and said first insulating substrate, wherein liquid crystal is sealed between said pixel electrode and said counter electrode.

11. The image display unit with screen input function according to claim 1, wherein each said pixel includes a second pixel electrode, an organic EL light emitting layer being provided on an upper layer of the second pixel electrode, and wherein the first pixel electrode is formed to cover said organic EL light emitting layer.

12. The image display unit with screen input function according to claim 11, wherein said organic EL light emitting layer has different light emitting color portions for each of said plurality of pixels.

13. An image display unit with screen input function for inputting information by touching operation to a pixel area comprised of a plurality of pixels on a screen formed on a first insulating substrate, said image display unit comprising, for each of said plurality of pixels:

a first thin-film transistor shielded from projection of light coming from the direction of a pixel surface, and a second thin-film transistor connected in series with the first thin-film transistor and not shielded from projection of light coming from the direction of the pixel surface;

a gate electrode of said first thin-film transistor being connected to an associated gate line;

a gate electrode of said second thin-film transistor being connected to an associated sensor control line;

a drain electrode or a source electrode of said first thin-film transistor being connected to an associated data line;

a storage capacitor having a first electrode connected to a source electrode or a drain electrode of said second thin-film transistor and to a first pixel electrode of said pixel; and an optical signal cumulative capacitor connected in parallel with said storage capacitor, wherein said second thin-film transistor is turned on by a sensing time selecting signal from said sensor control line during a period different from an image display period of said pixel, and photoelectric current generated by projection light sensing of said second thin-film transistor is accumulated as electric charge in said storage capacitor, wherein said accumulated electric charge is read out on said data line as light detecting current via said first thin-film transistor, and, after voltage conversion, said electric charge is provided as a detection signal of said touching operation, and wherein a first electrode of said optical signal cumulative capacitor is connected between said first thin-film transistor and said second thin-film transistor, and a second electrode of said optical signal cumulative capacitor is connected to a storage line.

* * * * *